United States Patent
Okuno

(10) Patent No.: US 7,340,135 B2
(45) Date of Patent: Mar. 4, 2008

(54) LIGHT SOURCE APPARATUS

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 6 days.

(21) Appl. No.: 11/394,204

(22) Filed: Mar. 31, 2006

(65) Prior Publication Data

US 2006/0245703 A1 Nov. 2, 2006

Related U.S. Application Data

(60) Provisional application No. 60/666,571, filed on Mar. 31, 2005.

(51) Int. Cl.
*G02B 6/00* (2006.01)
(52) U.S. Cl. ..................... 385/122
(58) Field of Classification Search ............. 385/122, 385/15, 27, 123; 359/326, 332, 188; 372/69, 372/70
See application file for complete search history.

(56) References Cited

U.S. PATENT DOCUMENTS

| | | | |
|---|---|---|---|
| 5,960,146 A | 9/1999 | Okuno et al. | |
| 6,101,021 A | 8/2000 | Kumagai et al. | |
| 6,813,423 B2 * | 11/2004 | Goto et al. | 385/122 |
| 6,925,236 B2 * | 8/2005 | Goto et al. | 385/122 |
| 6,944,201 B2 | 9/2005 | Bunting et al. | |

FOREIGN PATENT DOCUMENTS

| | | |
|---|---|---|
| JP | 10-90737 A | 4/1998 |
| JP | 1090737 A | 4/1998 |
| JP | 2002-236301 A | 8/2002 |
| WO | WO 2002/071142 A1 | 9/2002 |
| WO | WO 2002/071142 A2 | 9/2002 |

OTHER PUBLICATIONS

Fermann et al., "Environmentally stable Kerr-type mode-locked erbium fiber laser producing 360-fs pulses", Optics Letters vol. 19, No. 1, 1994.

(Continued)

*Primary Examiner*—Sarah Song
(74) *Attorney, Agent, or Firm*—McDermott Will & Emery LLP

(57) ABSTRACT

The present invention relates to a light source apparatus having a structure for stably supplying broadband pulsed light having a wavelength spectrum with an excellent flatness over a wide band. The light source apparatus employs, as a seed light source, a short-pulsed light source having such an excellent output pulse characteristic that the frequency bandwidth extending until the output pulse drops by 10 dB or 20 dB from a peak is 5 THz or more. The light source apparatus also includes a broadband light producing fiber having an optical characteristic suitable for combining with the short-pulsed light source. The broadband light producing fiber inputs pulsed light from the pulsed light source, and produces the broadband pulsed light by utilizing a nonlinear optical phenomenon. This structure yields broadband pulsed light having such a wavelength spectrum that a region whose power fluctuation is suppressed to 6 dB or less extends over 100 nm or more.

22 Claims, 17 Drawing Sheets

OTHER PUBLICATIONS

Ogura et al., "Precise SDH frequency operation of monolithic modelocked laser diodes with frequency tuning function", Electronics Letters vol. 35, No. 15, 1999.

Yokoyama et al., "Two-stage all-optical subharmonic clock recovery using modelocked semiconductor lasers", Electronics Letters vol. 36, No. 18, 2000.

Set et al., "Laser Mode Locking Using a Saturable Absorber Incorporating Carbon Nanotubes", Journal of Lightwave Technology, vol. 22, No. 1, 2004.

Suhler et al., "Soliton mode-locked Er:Yb:glass laser", Optics Letters vol. 30, No. 3, 2005.

Hori, Takashi et al., "Experimental and numerical analysis of widely broadened supercontinuum generation in highly nonlinear dispersion-shifted fiber with a femtosecond pulse," J. Opt. Soc. Am. B, Nov. 2004, vol. 21, No. 11, pp. 1969-1980, Optical Society of America.

Okuno, Toshiaki et al., "Silica-Based Functional Fibers with Enhanced Nonlinearity and Their Application," IEEE Journal of Selected Topics in Quantum Electronics, Sep./Oct. 1999, pp. 1385-1391, vol. 5, No. 5.

Mori, K. et al., "Flatly broadened supercontinuum spectrum generated in a dispersion decreasing fibre with convex dispersion profile," Electronics Letters, Oct. 1997, pp. 1806-1808, vol. 33, No. 21.

international Search Report for International Application PCT/JP2006/306295.

Hori, Takashi et al., "Experimental and numerical analysis of widely broadened supercontinuum generation in highly nonlinear dispersion-shifted fiber with a femtosecond pulse," J. Opt. Soc. Am. B, Nov. 2004, vol. 21, No. 11, pp. 1969-1980, Optical Society of America.

Okunuo, Toshiaki et al., "Silica-Based Functional Fibers with Enhanced Nonlinearity and Their Application, " IEEE Journal of Selected Topics in Quantum Electronics, Sep./Oct. 1999, pp. 1385-1391, vol. 5, No. 5.

Mori, K. et al. "Flatly broadened supercontinuum spectrum generated in a dispersion decreasing fibre with convex dispersion profile," Electronics Letters, Oct. 1997, pp. 1806-1808, vol. 33, No. 21.

* cited by examiner

Fig.3
(a)
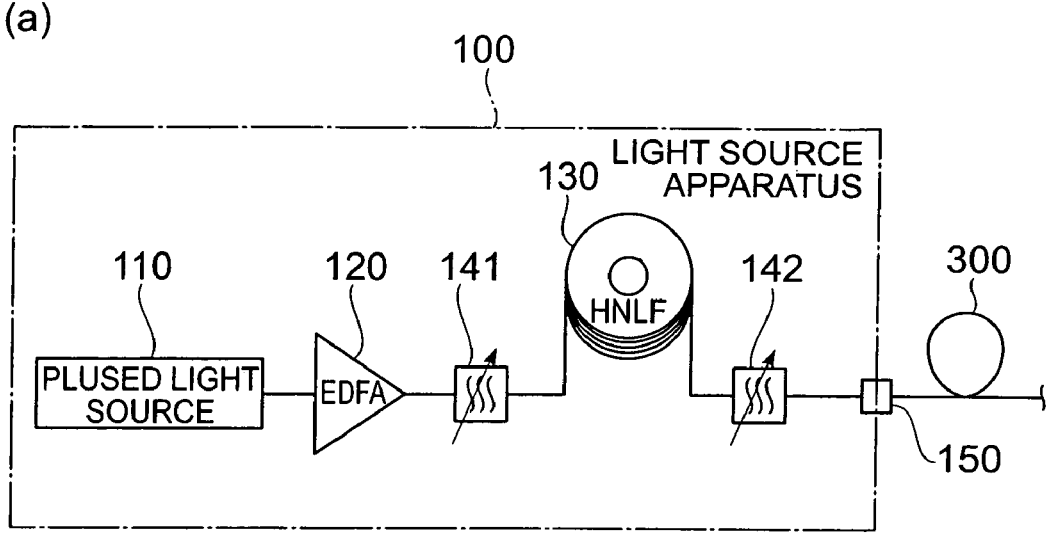
(b)
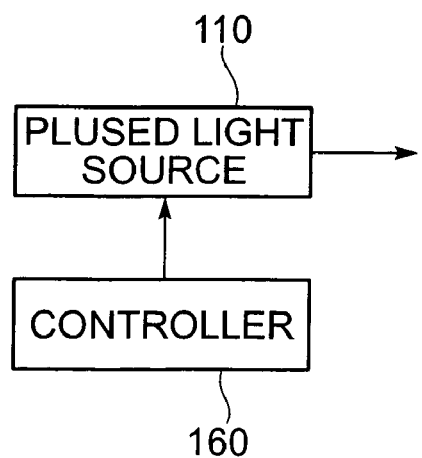

Fig. 10

| PARAMETER | TOLERABLE LEVEL 1 | TOLERABLE LEVEL 2 | TOLERABLE LEVEL 3 | TOLERABLE LEVEL 4 |
|---|---|---|---|---|
| LOSS (db/km) | <10×10³ | <10 | <1 | <0.5 |
| n2 (m²/W) | >3.0×10⁻²⁰ | >4.0×10⁻²⁰ | >5.0×10⁻²⁰ | |
| Aeff (μm²) | <30 | <20 | <10 | |
| MFD (μm) | <6.2 | <5 | <4 | |
| γ (/W/km) | >7 | >10 | >20 | |
| PMD (ps·km$^{-\frac{1}{2}}$) | <10 | <1 | <0.5 | <0.1 |
| BENDING LOSS AT DIAMETER OF 20 mm (dB/m) | <10 | <1 | | |
| BENDING LOSS AT DIAMETER OF 40 mm (dB/m) | <1 | | | |
| λc (μm) | <1.7 | <1.5 | <1.3 | |
| λcc (μm) | <1.5 | <1.3 | | |
| LENGTH (m) | <1000 | <100 | <10 | <1 |

Fig.11
(a)
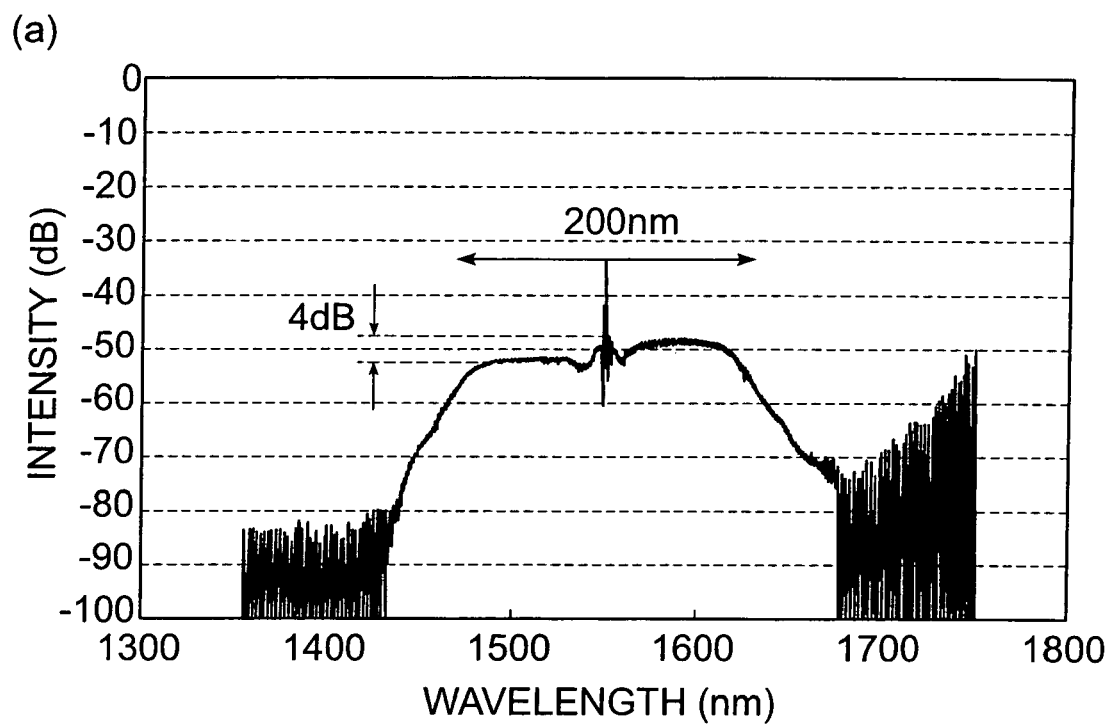
(b)
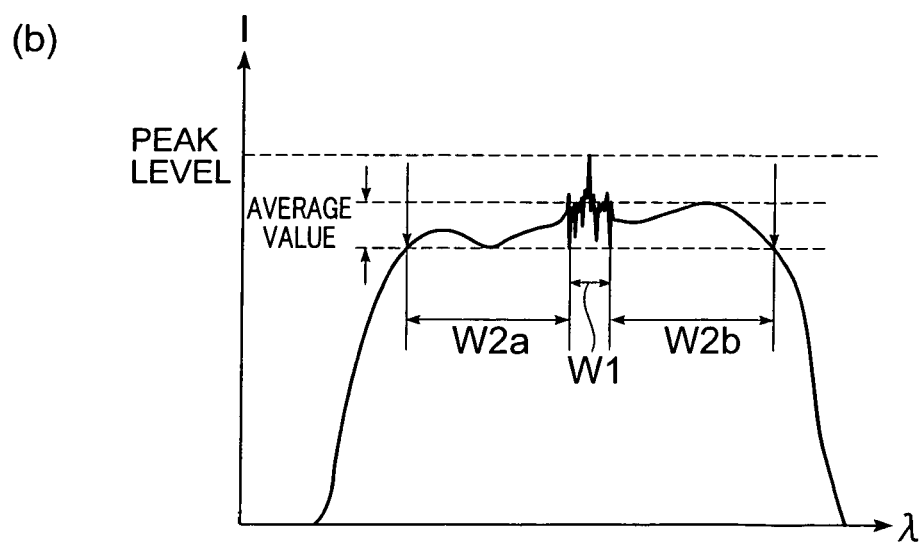

Fig.12

| PARAMETER | TOLERABLE LEVEL 1 | TOLERABLE LEVEL 2 | TOLERABLE LEVEL 3 | TOLERABLE LEVEL 4 |
|---|---|---|---|---|
| LOSS AT WAVELENGTH OF 1380 nm (dB/km) | $<10 \times 10^3$ | $<20$ | $<5$ | $<2$ |
| LOSS AT WAVELENGTH OF 1300 nm (dB/km) | $<10 \times 10^3$ | $<10$ | $<5$ | $<1.5$ |
| LOSS AT WAVELENGTH OF 1650 nm (dB/km) | $<10 \times 10^3$ | $<10$ | $<5$ | $<1.5$ |
| $n_2$ AT WAVELENGTH OF 1700 nm (m²/W) | $>2.5 \times 10^{-20}$ | $>3.0 \times 10^{-20}$ | $>4.5 \times 10^{-20}$ | |
| Aeff AT WAVELENGTH OF 1700 nm (μm²) | $<40$ | $<30$ | $<20$ | |
| MFD AT WAVELENGTH OF 1700 nm (μm) | $<6.2$ | $<5$ | $<4$ | |
| $\gamma$ AT WAVELENGTH OF 1700 nm (/W/km) | $>5$ | $>7$ | $>14$ | |
| TOTAL SECOND-ORDER PMD (ps²) | $<10$ | $<1$ | $<0.1$ | |
| BENDING LOSS AT DIAMETER OF 20 mm, WAVELENGTH OF 1700 nm (dB/m) | $<10$ | $<1$ | | |
| BENDING LOSS AT DIAMETER OF 40 mm, WAVELENGTH OF 1700 nm (dB/m) | $<1$ | | | |

Fig.13

| PARAMETER | TOLERABLE LEVEL 1 | TOLERABLE LEVEL 2 | TOLERABLE LEVEL 3 | TOLERABLE LEVEL 4 |
|---|---|---|---|---|
| FREQUENCY BANDWIDTH (THz) | >5 | >10 | >50 | >100 |
| WAVELENGTH SPECTRUM FLATNESS OF BROADBAND PULSED LIGHT (dB) WAVELENGTH RESOLUTION: 1 nm | <6 | <3 | <2 | |
| BROADBAND PULSED LIGTH INTENSITY (mW) | >1 | >10 | >50 | |
| RELATIVE COHERENCE COEFFICIENT $g^{12}$ | >0.5 | >0.8 | >0.9 | |
| WAVELENGTH SPECTRUM FLUCTUATION WIDTH (nm) | <300 | <100 | <20 | |
| WAVELENGTH SPECTRUM INTENSITY FLUCTUATION (dB) | <10 | <3 | <1 | |

LIGHT SOURCE APPARATUS

CROSS-REFERENCE TO RELATED APPLICATION

This application claims priority to Provisional Application Ser. No. 60/666,571 filed on Mar. 31, 2005 by the same Applicant, which is hereby incorporated by reference in its entirety.

BACKGROUND OF THE INVENTION

1. Field of the Invention

The present invention relates to a light source apparatus which generates broadband light by utilizing a nonlinear optical phenomenon in an optical fiber.

2. Related Background Art

As optical communication techniques evolve, light sources generating short-pulsed light with a wide output band are expected. As a technique concerning such a light source, attention has been given to SC (supercontinuum) light which is broadband pulsed light generated when pulsed light having a high peak power is caused to enter an optically nonlinear medium as seed light. In particular, Patent Document 1 discloses a light source apparatus for generating SC light.

Mainly known as seed light sources (pulsed light sources) outputting seed light for yielding the SC light are light sources outputting short-pulsed light having such a narrow pulse duration as picoseconds or femtoseconds, light sources outputting pulsed light with a relatively wide pulse duration on the order of nanoseconds, light sources outputting continuous light (CW light sources), and the like.

In particular, Nonpatent Document 1 discloses a modelocked fiber laser utilizing an erbium-doped fiber (EDF) adapted to oscillate at a wavelength near 1550 nm which falls within an important wavelength band in optical communications. Patent Document 2 discloses an optical pulse generator using an optical fiber. As other examples of seed light sources, Patent Document 3 discloses a light source employing a semiconductor saturable absorber mirror which enables stable modelocked oscillation, whereas Nonpatent Document 2 discloses a modelocked semiconductor laser. As modelocking techniques, those disclosed in Nonpatent Documents 3 and 4 have also been known, for example.

Patent Document 1: U.S. Pat. No. 5,960,146
Patent Document 2: U.S. Pat. No. 6,101,021
Patent Document 3: U.S. Pat. No. 6,944,201 B2
Nonpatent Document 1: M. E. Fermann, et al., "Environmentally stable Kerr-type mode-locked erbium fiber laser producing 360-fs pulses", OPTICS LETTERS, Vol. 19, No. 1, pp. 43-45, Jan. 1, 1994.
Nonpatent Document 2: I. Ogura, et al., "Precise SDH frequency operation of monolithic modelocked laser diodes with frequency tuning function", ELECTRONICS LETTERS, Vol. 35, No. 15, Jul. 22, 1999.
Nonpatent Document 3: H. Yokoyama, et al., "Two-stage all-optical subharmonic clock recovery using modelocked semiconductor lasers", Vol. 36, No. 18, Aug. 31, 2000.
Nonpatent Document 4: Sze Y. Set, et al., "Laser Mode Locking Using a Saturable Absorber Incorporating Carbon Nanotubes", Journal of Lightwave Technology, Vol. 22, No. 1, pp. 51-56, January 2004.

SUMMARY OF THE INVENTION

The inventors studied the conventional techniques mentioned above and, as a result, have found the following problems.

The broadband light source of the above-mentioned Patent Document 1 generates SC light, which is broadband pulsed light, by utilizing a dispersion-decreasing fiber (DDF) whose chromatic dispersion decreases from its light entrance end to light exit end. The principle of generating the SC light will be explained with reference to FIG. 1. FIG. 1 is a view for explaining the principle of SC light generation. In particular, the area (a) shows a schematic structure of a DDF 1, the area (b) shows the chromatic dispersion of the DDF 1 along its longitudinal direction at a wavelength of 1550 nm, the area (c) shows respective pulsed light waveforms at a light entrance end (Z=0) and a position (Z=L1) separated by a distance L1 from the light entrance end, and the area (d) shows respective pulsed light waveforms at the light entrance end (Z=0), at the position (Z=L1) separated by the distance L1 from the light entrance end, and a position (Z=L2) separated by a distance L2 from the light entrance end.

In the broadband light source described in the above-mentioned Patent Document 1, the pulsed light emitted from the pulsed light source is made incident on the light entrance end of the DDF 1. The pulsed light (input pulsed light) incident on the light entrance end incurs pulse compression (soliton compression regime) due to the soliton adiabatic compression effect during when propagating through a positive dispersion region of the DDF 1 by the distance L1 as indicated by the area (c) of FIG. 1.

While thus generated pulsed light propagates through the DDF 1 from the distance L1 to L2 from the light entrance end in the DDF 1, broadband light (SC light) is generated according to the generated pulsed light (SC generation regime), and this broadband light is emitted from the light exit end of the DDF 1. As shown in the area (d) of FIG. 1, the wavelength spectrum bandwidth of the broadband light is at least twice that of the input pulsed light.

In the broadband light source described in Patent Document 1, as in the foregoing, pulsed light (generated pulsed light) in which the input pulsed light is compressed is produced in the region extending from the light entrance end of the DDF 1 to the distance L1, whereas broadband light is produced according to the generated pulsed light in the region extending from the distance L1 to L2. Therefore, when wavelength shifting conditions and SC conditions in the DDF 1 are appropriately designed and controlled, broadband light having a desirable wavelength band and bandwidth can be produced while minimizing the waste of energy.

However, the wavelength spectrum of thus produced broadband light may fluctuate greatly because of fluctuations in spectrum and intensity as shown in the area (a) of FIG. 2. Spectrum S1 shown in FIG. 2 indicates a wavelength spectrum designed value of the output pulsed light, whereas spectrum S2 indicates a wavelength spectrum measured value of the pulsed light emitted in practice. Such spectrum fluctuations and intensity fluctuations in the output pulsed light seem to be caused by the pulsed light source and/or DDF 1.

The causes on the pulsed light source side may include unstable output pulse characteristics such as fluctuations of the center wavelength in the output pulsed light, timing jitters in the output pulsed light, and intensity fluctuations. The causes on the DDF 1 side include fluctuations in polarization due to temperature changes as well as its optical characteristics. In particular, timing jitters occurring in the pulsed light source if any will remain after the broadband light generation and may increase as the case may be. This may increase reception penalties at the time of high-speed signal transmissions, make operations unstable because of timing shifts in high-speed signal processing, and cause errors in synchronization in modelocked measurement.

When wavelength fluctuations in pulse output are generated in the pulsed light source, large variations may occur in the wavelength spectrum width of the resulting broadband light as shown in the area (b) of FIG. 2. In the area (b) of FIG. 2, spectra G210, G220, G230, and G240 indicate wavelength spectra of broadband light obtained when pulsed light is incident with center wavelengths of 800 nm, 825 nm, 850 nm, and 875 nm, respectively.

For solving the problems mentioned above, it is an object of the present invention to provide a light source apparatus which stably supplies broadband pulsed light having a wavelength spectrum with an excellent flatness over a wide band by combining a short-pulsed light source having an excellent output pulse characteristic with a broadband light producing fiber which is favorably combinable with the short-pulsed light source.

The light source apparatus according to the present invention comprises a pulsed light source as a seed light source and a broadband light producing fiber for inputting pulsed light from the pulsed light source and producing broadband pulsed light by utilizing a nonlinear optical phenomenon, whereas the light source apparatus outputs the broadband pulsed light having such a wavelength spectrum that a region whose power fluctuation is suppressed to 6 dB or less extends over 100 nm or more. In other words, the wavelength spectrum of the broadband pulsed light finally emitted from the light source apparatus has a flatness of 6 dB or less over a wavelength band of 100 nm or more. In particular, the pulsed light source acting as the seed light source is a short-pulsed light source having such an excellent output pulse characteristic that the bandwidth of a frequency band extending until the output pulse drops by 10 dB from a peak (hereinafter referred to as "10-dB drop frequency band") is 5 THz or more, whereas the broadband light producing fiber producing the broadband pulsed light has an optical characteristic which is optimal for combining with this pulsed light source. As the seed light source, a short-pulsed light source having such an excellent output pulse characteristic that the bandwidth of a frequency band extending until the output pulse drops by 20 dB from the peak (hereinafter referred to as "20-dB drop frequency band") is 5 THz or more may be employed in the light source apparatus.

Here, the wavelength spectrum of the broadband pulsed light emitted from the broadband light producing fiber may have any one of degrees of flatness of 6 dB or less, 3 dB or less, and 2 dB or less. The output pulse characteristic of the pulsed light source may have a 10-dB drop frequency band or 20-dB drop frequency band of any one of 5 THz or more, 10 THz or more, 50 THz or more, and 100 THz or more. The relationship between the tolerable bandwidth of the 10-dB drop frequency band or 20-dB drop frequency band and the tolerable range of the wavelength spectrum flatness of the emitted broadband pulsed light is determined by arbitrarily combining the values listed above.

The light source apparatus according to the present invention may further comprise a controller for regulating the output pulse characteristic in the pulsed light source. In this case, the controller can perform not only chirping control and pulse intensity control but also pulsed waveform control of the pulsed light (seed light) emitted from the pulsed light source. When a demultiplexer for separating a part of the broadband pulsed light emitted from the broadband light producing fiber is arranged on the light exit end side of the broadband light producing fiber, the controller can monitor the power of the broadband pulsed light emitted from the broadband light producing fiber and regulate the output pulse characteristic (mainly represented by the pulse intensity) of the pulsed light source according to a result of monitoring.

The light source apparatus according to the present invention may further comprise a coupling fiber arranged between the pulsed light source and the broadband light producing fiber. The coupling fiber has a light entrance end (with a coupling loss of 3 dB or less, preferably 1 dB or less) and a light exit end fusion-spliced to the light entrance end of the broadband light producing fiber. When the coupling fiber is arranged in front of (on the upstream of) the broadband light producing fiber having a severe coupling condition, the coupling loss is reduced, whereby the resistance to fluctuations such as vibrations can be improved. The structure in which the light exit end of the coupling fiber and the light entrance end of the broadband light producing fiber are fusion-spliced to each other reduces the splice loss between the splice fiber and the broadband light producing fiber, whereby the seed light can be made incident on the broadband light producing fiber more efficiently. In particular, for raising the power of seed light incident on the broadband light producing fiber, an amplification fiber may be employed as the coupling fiber.

In the light source apparatus according to the present invention, the broadband light producing fiber comprises a core region extending along a predetermined axis and a cladding region provided on an outer periphery of the core region. In particular, the cladding region may be constructed by a single layer or a plurality of layers having respective refractive indexes different from each other.

As a broadband light producing medium suitable for the pulsed light source having the output pulse characteristic mentioned above, the broadband light producing fiber preferably has, as characteristics at a wavelength of 1550 nm, a nonlinear refractive index n2 of $3 \times 10^{-20}$ m$^2$/W or more, an effective area $A_{\it eff}$ of 30 µm$^2$ or less, a nonlinearity constant γ of 7/W/km or more, a transmission loss of 10 dB/m or less, a polarization-mode dispersion PMD of 10 ps·km$^{-1/2}$ or less, a mode field diameter MFD of 6.2 µm or less, a bending loss of 10 dB/m or less when bent at a diameter of 20 mm, and a bending loss of 1 dB/m or less when bent at a diameter of 40 mm. Preferably, the broadband light producing fiber has a fiber length of 1 km or less, a cutoff wavelength λc of 1.7 µm or less at a fiber length of 2 m, and a cable cutoff wavelength λcc of 1.5 µm or less.

In the light source apparatus according to the present invention, the pulsed light source may be a fiber laser. When the output end of the pulsed light source is a light output end of an optical fiber member in particular, the light entrance end of the broadband light producing fiber can directly be fusion-spliced thereto without the aid of the coupling fiber mentioned above. This greatly suppresses the reduction in the power of pulsed light incident on the broadband light producing fiber.

For further raising the power of pulsed light incident on the broadband light producing fiber, it will be preferred if the fiber laser is partly constructed by an amplification fiber.

The pulsed light source may include a saturable absorber arranged within a laser cavity. Such a saturable absorber preferably has a high-speed response characteristic of a nanosecond or shorter, for which semiconductor saturable absorbers and carbon nanotubes are suitable, for example. As in the light source described in the above-mentioned Patent Document 3, the pulsed light source may be constructed by a semiconductor saturable absorber mirror.

The pulsed light source may include an electrooptic modulator in order to make it possible for electric signals from the outside to regulate the pulsed light source itself. Preferred as the electrooptic modulator in this case are lithium niobate which is excellent in high-speed response and semiconductor optical amplifiers which can be made smaller and integrated.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a view showing the structure of a first embodiment of the light source apparatus according to the present invention;

FIG. 10 is a (first) table listing properties of the highly nonlinear fiber shown in FIG. 9;

FIG. 11 is a spectrum of pulsed light emitted from the light source apparatus according to the first embodiment;

FIG. 12 is a (second) table listing properties of the highly nonlinear fiber shown in FIG. 9;

FIG. 13 is a table listing properties of pulsed light emitted from the light source apparatus according to the present invention;

DETAILED DESCRIPTION OF THE PREFERRED EMBODIMENTS

Figure 1:
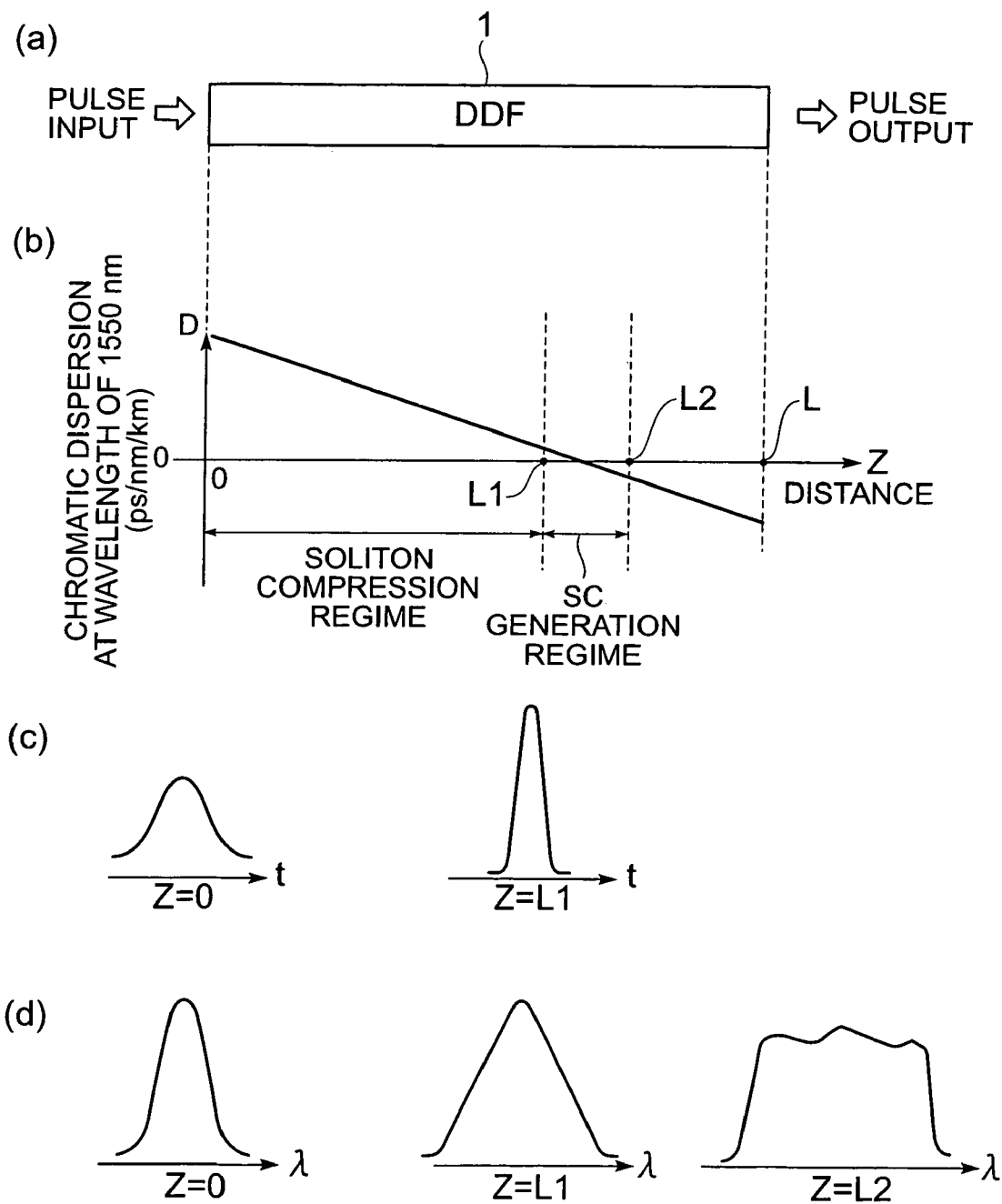
FIG. 1 is a view for explaining the principle of generating SC light.
Figure 2:
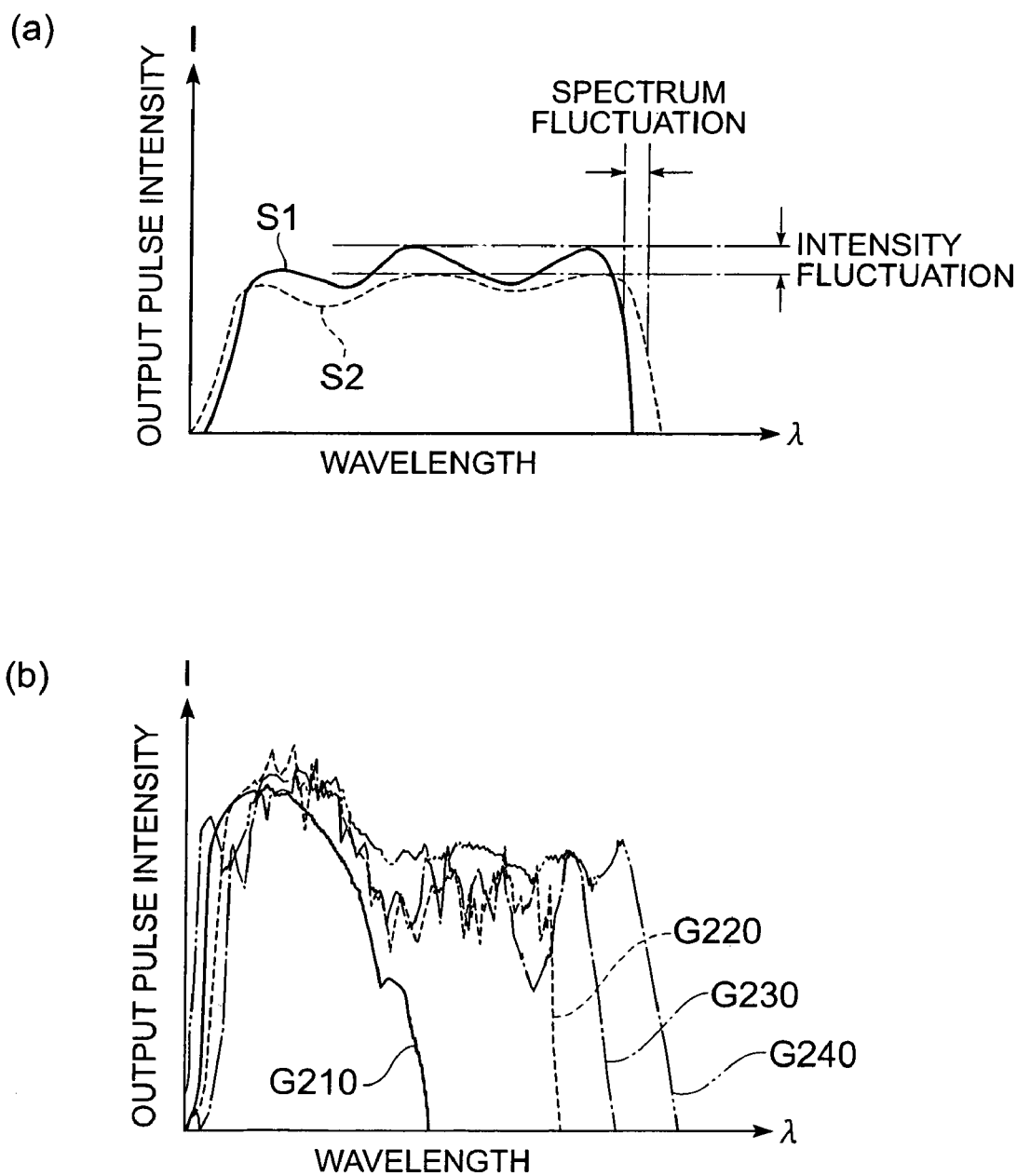
FIG. 2 is a view for explaining problems in a conventional light source apparatus.

In the following, embodiments of the light source apparatus according to the present invention will be explained in detail with reference to FIGS. 3 to 17. In the explanation of the drawings, parts and constituents identical to each other will be referred to with numerals identical to each other without repeating their overlapping descriptions.

First Embodiment

FIG. 3 is a view showing the structure of a first embodiment of the light source apparatus according to the present invention.

As shown in the area (a) of FIG. 3, the light source apparatus 100 according to the first embodiment comprises a pulsed light source 110, an erbium-doped fiber amplifier (EDFA) 120, a highly nonlinear fiber (HNLF) 130 wound as a broadband light producing fiber about a coil, and bandpass filters BPFs 141, 142 arranged at both ends of the highly nonlinear fiber 130. For making it possible to connect with other optical components such as an optical fiber transmission line 300, a connector 150 is arranged at an output end of the light source apparatus 100. For directly regulating the output pulse characteristic of the pulsed light source 110, the light source apparatus 100 may further comprise a controller 160 as shown in the area (b) of FIG. 3.

The wavelength spectrum of the broadband pulsed light finally emitted from the light source apparatus 100 having the structure mentioned above has one of degrees of flatness of 6 dB or less, 3 dB or less, and 2 dB or less over a wavelength band of 100 nm or greater. The pulsed light source 110 employed in the light source apparatus 100 has such an output pulse characteristic that the bandwidth of its 10-dB drop frequency band or 20-dB drop frequency band is one of 5 THz or more, 10 THz or more, 50 THz or more, and 100 THz or more. The relationship between the tolerable bandwidth of the 10-dB drop frequency band or 20-dB drop frequency band and the tolerable range of the wavelength spectrum flatness of the emitted broadband pulsed light is determined by arbitrarily combining the values listed above.

More specifically, the pulsed light source 110 outputs pulsed light having a pulse duration of 100 ps or less as seed light. The pulse duration of the pulsed light may be at any one of tolerable levels of 100 ps or less, 10 ps or less, 1 ps or less, and 100 fs or less. The repetition frequency of the pulsed light emitted from the pulsed light source 110 may be at any one of tolerable levels of 1 MHz or more but 1 THz or less, 1 MHz or more but 100 GHz or less, 10 MHz or more but 10 GHz or less, and 10 MHz or more but 1 GHz or less. The peak power of the pulsed light emitted from the pulsed light source 110 may be at any one of tolerable levels of 1 W or more, 10 W or more, 1 kW or more, 10 kW or more, and 1 MW or more. The average output power of the pulsed light emitted from the pulsed light source 110 may be at any one of tolerable levels of 10 mW or more, 100 mW or more, and 1 W or more. The pulse duration, repetition frequency, peak power, and average power of pulsed light emitted from the pulsed light source 110 are determined by arbitrarily combining the parameters listed above.

The pulsed light emitted from the pulsed light source 110 may have any one of forms of $sech^2$ and Gaussian types. The time-bandwidth product of the pulsed light emitted from the pulsed light source 110 may be at any one of tolerable levels of 1 or less, 0.6 or less, and 0.4 or less.

For stabilizing the wavelength spectrum of resulting broadband pulsed light, the pulsed light source 110 acting as a seed light source can suppress the timing jitter of the pulsed light emitted as seed light to 10 ps or less, 200 fs or less, or 100 fs or less. The pulsed light source 110 can also suppress the intensity fluctuation of the pulsed light emitted as seed light to 3 dB or less, 1 dB or less, 0.5 dB or less, or 0.1 dB or less. The pulsed light source 110 can suppress the center frequency fluctuation of the pulsed light emitted as seed light to 5 nm or less, 1 nm or less, or 0.1 nm or less. In addition, the pulsed light source 110 can suppress the pulse duration fluctuation of the pulsed light emitted as seed light to 10 ps or less, 1 ps or less, 500 fs or less, 200 fs or less, or 100 fs or less. The measurement time for the timing jitter, intensity fluctuation, and pulse duration fluctuation of the pulsed light is any one of 2 seconds, 60 seconds, 1 hour, 24 hours, 30 days, and 1 year.

The highly nonlinear optical fiber 130 that can construct the light source apparatus 100 when combined with the pulsed light source 110 preferably has, as characteristics at a wavelength of 1550 nm, a nonlinear refractive index n of $3 \times 10^{-20}$ $m^2/W$ or more, an effective area $A_{eff}$ of 30 $\mu m^2$ or less, a nonlinearity constant γ of 7/W/km or more, a transmission loss of 10 dB/m or less, a polarization-mode dispersion PMD of 10 $ps \cdot km^{-1/2}$ or less, a mode field diameter MFD of 6.2 μm or less, a bending loss of 10 dB/m or less when bent at a diameter of 20 mm, and a bending loss of 1 dB/m or less when bent at a diameter of 40 mm. Preferably, the broadband light producing fiber has a fiber length of 1 km or less, a cutoff wavelength λc of 1.7 μm or less at a fiber length of 2 m, and a cable cutoff wavelength λcc of 1.5 μm or less.

In particular, the nonlinear refractive index n may be at any one of tolerable levels of $3 \times 10^{-20}$ $m^2/W$ or more, $4.0 \times 10^{-20}$ $m^2/W$ or more, and $5.0 \times 10^{-20}$ $m^2/W$ or more. Here, n2 is a value with respect to linearly polarized input light. The effective area $A_{eff}$ may be at any one of tolerable levels of 30 $\mu m^2$ or less, 20 $\mu m^2$ or less, and 10 $\mu m^2$ or less. The nonlinearity constant γ may be at any one of tolerable levels of 7/W/km or more, 10/W/km or more, and 20/W/km or more. The transmission loss may be at any one of tolerable levels of $10 \times 10^3$ dB/km (=10 dB/m) or less, 10 dB/km or less, 1 dB/km or less, and 0.5 dB/km or less. The polarization-mode dispersion PMD may be at any one of tolerable levels of 10 $ps \cdot km^{-1/2}$ or less, 1 $ps \cdot km^{-1/2}$ or less, 0.5 $ps \cdot km^{-1/2}$ or less, and 0.1 $ps \cdot km^{-1/2}$ or less. The mode field diameter MFD may be at any one of tolerable levels of 6.2 μm or less, 5 μm or less, and 4 μm or less. The bending loss upon bending at a diameter of 20 mm may be at any one of tolerable levels of 10 dB/m or less and 1 dB/m or less. It will be sufficient if the bending loss upon bending at a diameter of 40 mm is 1 dB/m or less.

The length of the highly nonlinear fiber 130 may be any one of 1 km or less, 100 m or less, 10 m or less, and 1 m or less. The cutoff wavelength λc at a fiber length of 2 m may be anyone of 1.7 μm or less, 1.5 μm or less, and 1.3 μm or less. The cable cutoff wavelength λcc may be any one of 1.5 μm or less and 1.3 μm or less.

The combination of the fiber parameters mentioned above can be determined by arbitrarily combining the tolerable levels listed above.

As shown in the area (a) of FIG. 3, the highly nonlinear fiber 130 is wound about a coil. Here, the outer diameter of the coil is preferably as small as possible, and desirably 120 mm or less. When the highly nonlinear fiber 130 is resistant to bending loss, the outer diameter can be set to 60 mm or less. The inner diameter of the coil, which is determined by its relationship to the height of the coil, is 60 mm or less, preferably 30 mm or less. This can achieve a sufficiently, small size. If the inner diameter of the coil can be reduced to 20 mm or less, the outer diameter of the coil can become 60 mm or less while winding a sufficiently long nonlinear fiber, whereby the fiber can be expected to be employed in various fields of applications, e.g., incorporated in transmitters/receivers currently used in optical communications. The material for the coil is preferably a metal such as aluminum or copper from the viewpoint of attaining stability and high reliability, but may be a resin or the like as well. The highly nonlinear fiber 130 may also be fixed as being sunk into a resin such as gel instead of being wound about the coil. It will be desirable that necessary parts such as the drum and flanges of the coil be processed such as to be resistant to external temperatures. In this case, the coil is constructed such that the drum part is made of a material having a coefficient of thermal expansion lower than that of other parts, or the coil itself is constituted by a material having a low coefficient of thermal expansion. This can effectively keep temperature changes from fluctuating the transmission loss, polarization mode dispersion PMD, and chromatic dispersion.

Figure 4:
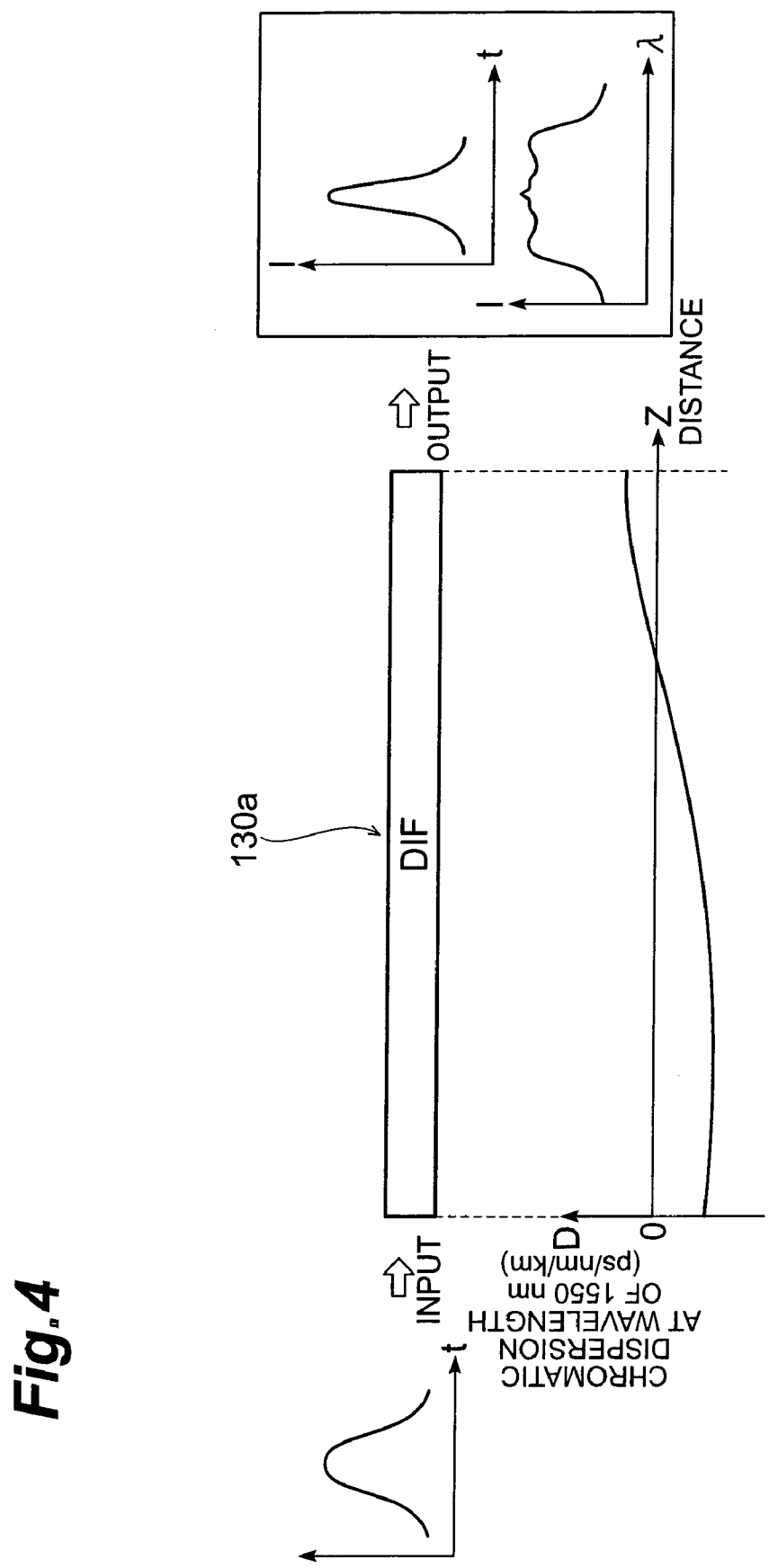
FIG. 4 is a view for explaining a first example of applying a highly nonlinear fiber to the light source apparatus according to the present invention.

FIG. 4 is a view for explaining a first example of applying a highly nonlinear fiber to the light source apparatus according to the present invention. In the example of FIG. 4, a dispersion increasing fiber DIF 130a whose chromatic dispersion at a wavelength of 1550 nm increases along a longitudinal axis thereof is employed as a broadband light producing fiber, whereas the DIF 130a produces broadband light as follows.

It has been known that the DIF 130a usually does not produce super-broadband light. Its spectrum has been known to exhibit a linear chirping characteristic in a negative dispersion fiber region. When pulsed light having an appropriate characteristic is incident on the DIF 130a, a linearly chirped pulse with low noise is compressed by a downstream positive dispersion fiber region, whereby broadband light having a narrow pulse duration is obtained. When prechirping or waveform processing of input pulses, which will be explained later, is effected before the incidence of pulses, pulse waveforms can be regulated in the DIF 130a as well. The DIF 130a may be either unitary or constructed by a plurality of fibers having respective chromatic dispersion characteristics different from each other.

Figure 5:
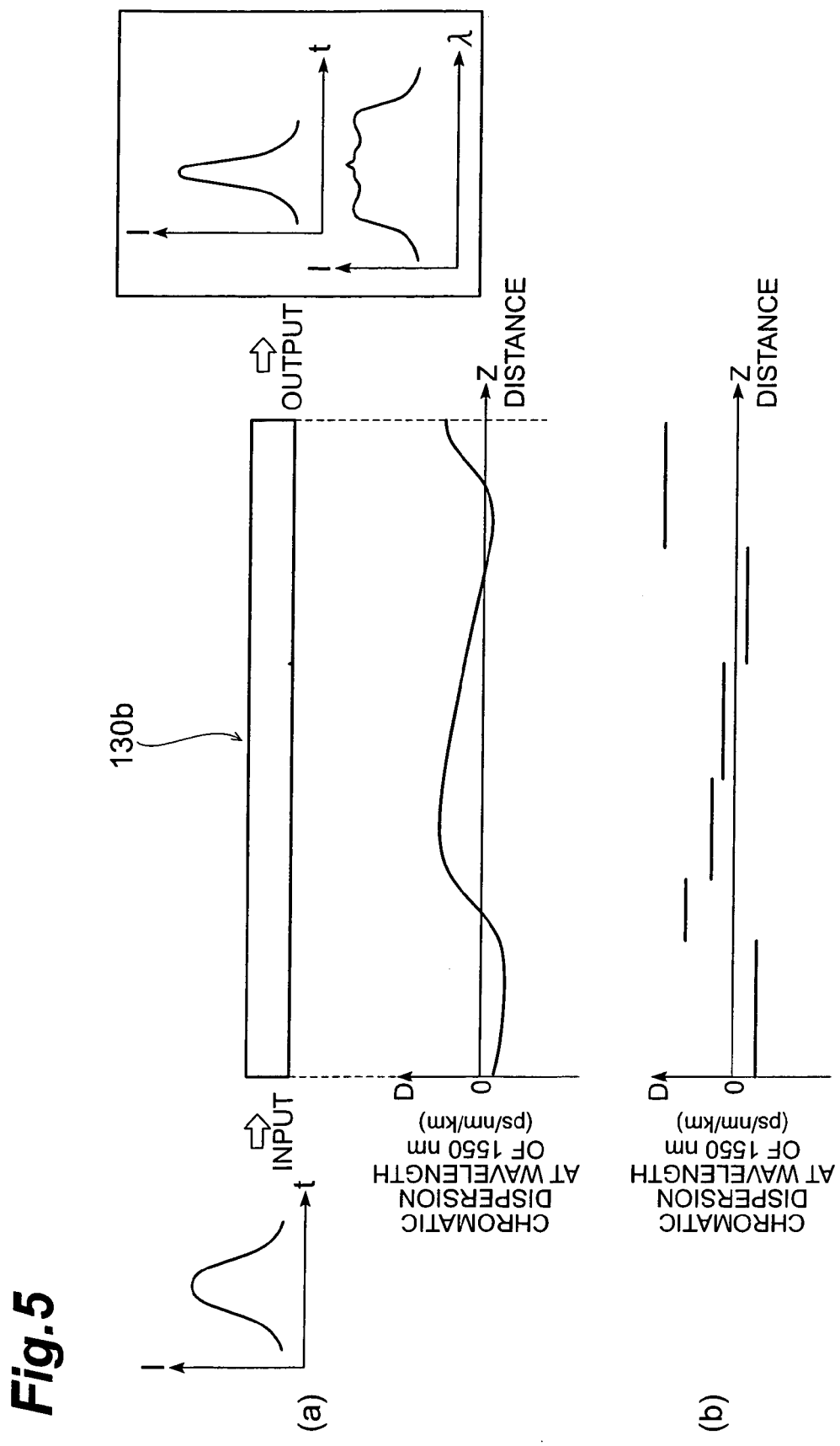
FIG. 5 is a view for explaining a second example of applying a highly nonlinear fiber to the light source apparatus according to the present invention.

FIG. 5 is a view for explaining an example of applying a highly nonlinear fiber to the light source apparatus according to the present invention. In the area (a) of FIG. 5, a dispersion management fiber 130b whose chromatic dispersion at a wavelength of 1550 nm repeatedly increases and decreases along the longitudinal direction thereof is employed as a broadband light producing fiber, whereby the broadband light is produced by the dispersion management fiber 130b as follows.

For obtaining pulsed light having a desirable output power, frequency bandwidth, and spectrum form, it is important not only to change the input pulse condition but also to longitudinally regulate the dispersion of the broadband light producing fiber. In the second applied example, the wavelength spectrum of input pulsed light is initially expanded by a negative dispersion fiber region. Thereafter, the pulsed light propagating through a positive dispersion fiber region causes pulse compression. In a fiber region whose dispersion is further reduced, the pulse compression is promoted in a state closer to soliton adiabatic compression. After the frequency band is further expanded in a fiber region whose dispersion reaches a negative state again, the pulse compression is performed in a positive dispersion fiber region such as to yield a desirable pulse duration. Since a region where the pulse compression is effected in the middle is provided within the fiber 130b even though the transmission loss is high in the fiber 130b, the wavelength spectrum in the output pulsed light is efficiently expanded.

The DIF 130b shown in the second applied example may be either unitary as illustrated in the area (a) or constructed by a plurality of fibers having respective chromatic dispersion characteristics different from each other as illustrated in the area (b).

Figure 6:
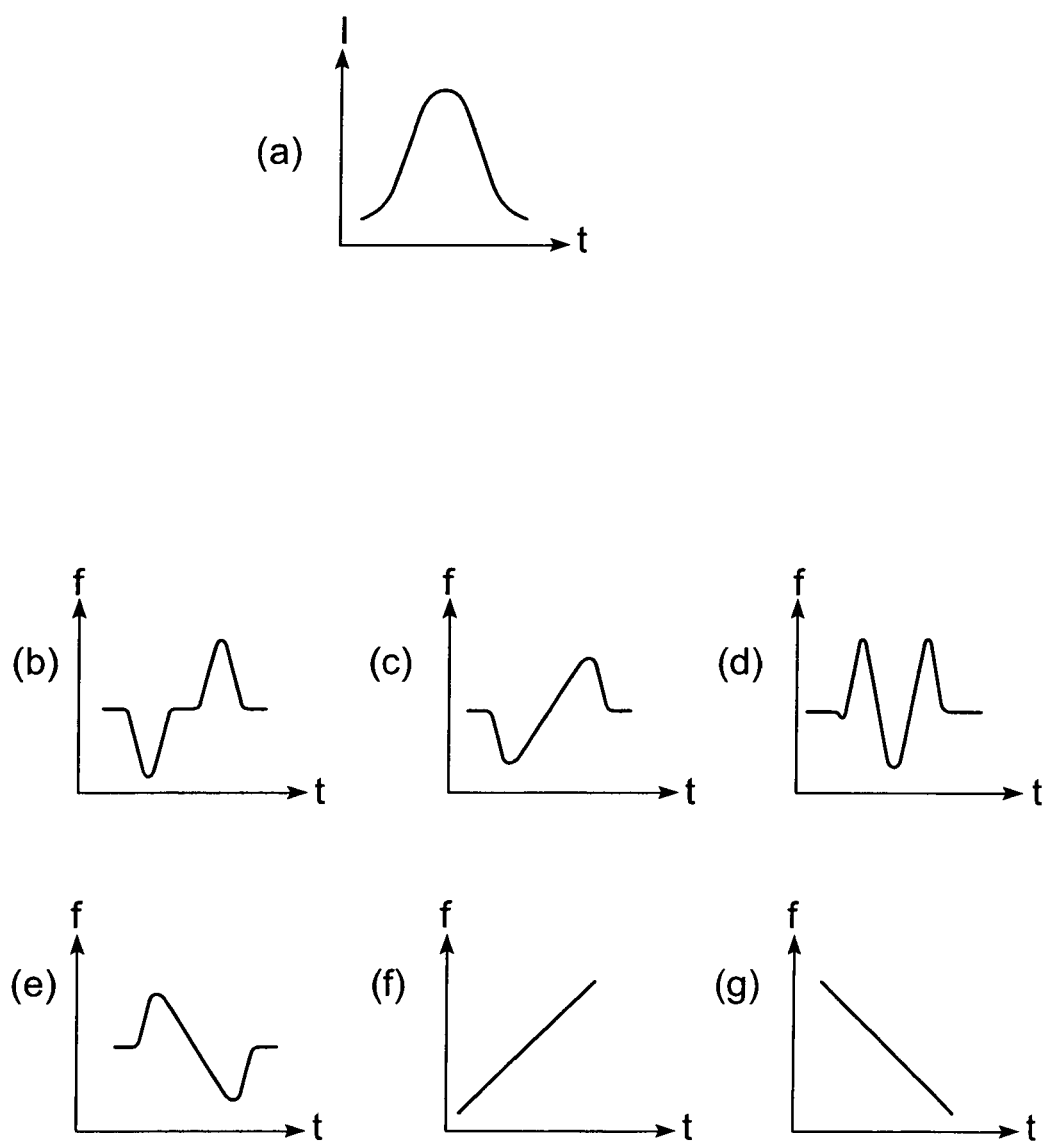
FIG. 6 is a view for explaining chirping control of a pulsed light source in the light source apparatus according to the present invention.
Figure 7:
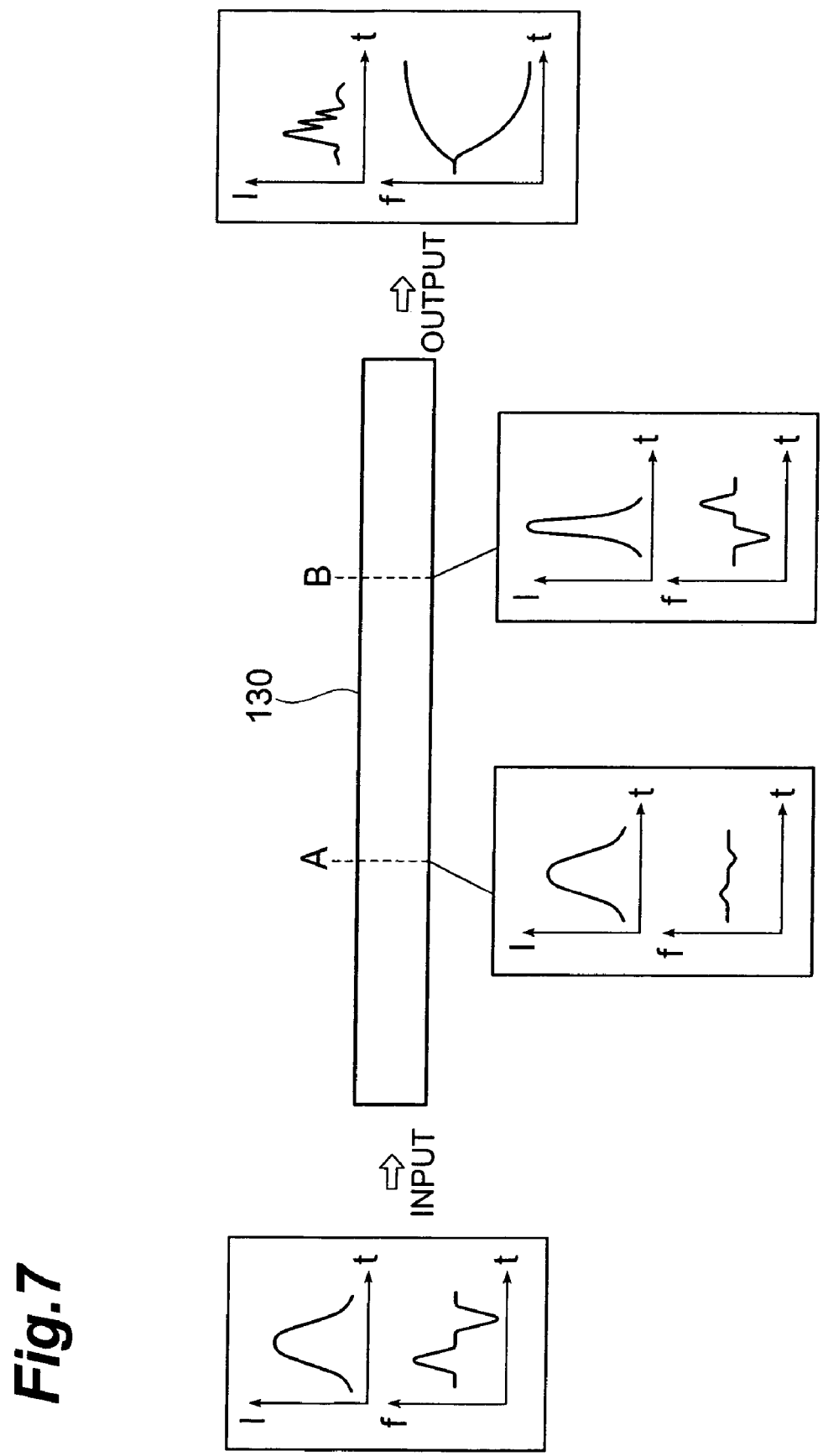
FIG. 7 is a view for explaining changes in pulsed light which is subjected to chirping control in the highly nonlinear fiber.

FIG. 6 is a view for explaining chirping control of a pulsed light source in the light source apparatus according to the present invention. As shown in the area (b) of FIG. 3, the chirping control is performed by the controller 160. Here, the area (a) shows the waveform of pulsed light emitted from the pulsed light source 110. The pulsed light emitted from the pulsed light source 110 may also be provided with any one of chirping characteristics shown in the areas (b) to (g). Changes in chirping-controlled pulsed light incident on the highly nonlinear fiber 130 will now be explained with reference to FIG. 7.

When the chirping-controlled pulsed light is incident, the chirping is reduced by self-phase modulation in the highly nonlinear fiber 130 (at point A in the highly nonlinear fiber 130). Here, the pulse waveform is maintained while the pulsed light propagates through the highly nonlinear fiber 130 by a certain distance. Thereafter, the SPM further increases, whereby the pulse compression occurs in connection with a positive chromatic dispersion (at point B in the highly nonlinear fiber 130). As a result, the pulsed light attains a higher peak power, so as to produce broadband pulsed light, whereby thus produced broadband pulsed light is emitted from the light exit end of the highly nonlinear fiber 130.

Figure 8:
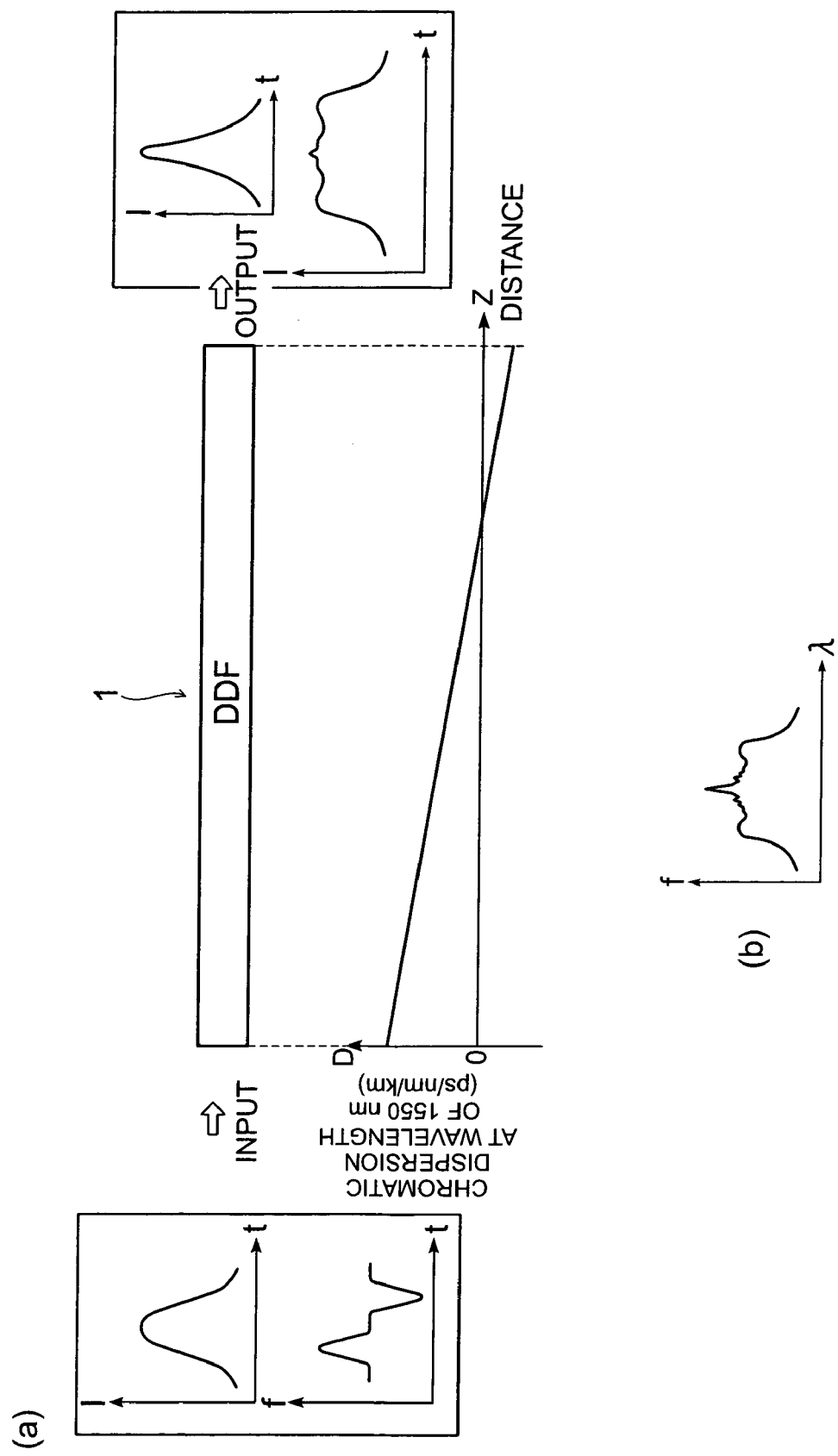
FIG. 8 is a view for explaining a third example of applying a highly nonlinear fiber to the light source apparatus according to the present invention.

FIG. 8 is a view for explaining a third example of applying a highly nonlinear fiber to the light source apparatus according to the present invention. The third applied example, which employs the DDF 1 as a broadband light producing fiber, is shown by way of example for explaining the fact that desirable broadband light is stably obtained when chirping of pulsed light emitted from the pulsed light source 110 is controlled even in the case where the DDF 1 is employed.

This chirping control is also effected by the controller 160 for the pulsed light source 110 as shown in the area (b) of FIG. 3. It is difficult for the DDF 1 to attain broadband light with a desirable wavelength spectrum, since conditions of pulsed light incident on the DDF 1 are determined uniquely. For example, the power condition for input pulses is determined according to a fiber, whereby the power of the broadband pulsed light emitted from the fiber is hard to set freely. However, regulating the chirping of input pulses can alleviate the power requirement for the input pulses, whereby the power range for the broadband pulsed light emitted from the DDF 1 can be expanded. Regulating the waveform of the pulsed light incident on the DDF 1 can also control characteristics of the broadband light emitted from the DDF 1. This includes arbitrarily distorting the pulse waveform. When pulsed light not regulated in terms of chirping is incident as seed light on the DDF 1, the wavelength spectrum of the broadband pulsed light emitted from the DDF 1 is distorted (i.e., its flatness remarkably deteriorates) as shown in the area (b) of FIG. 8.

Figure 9:
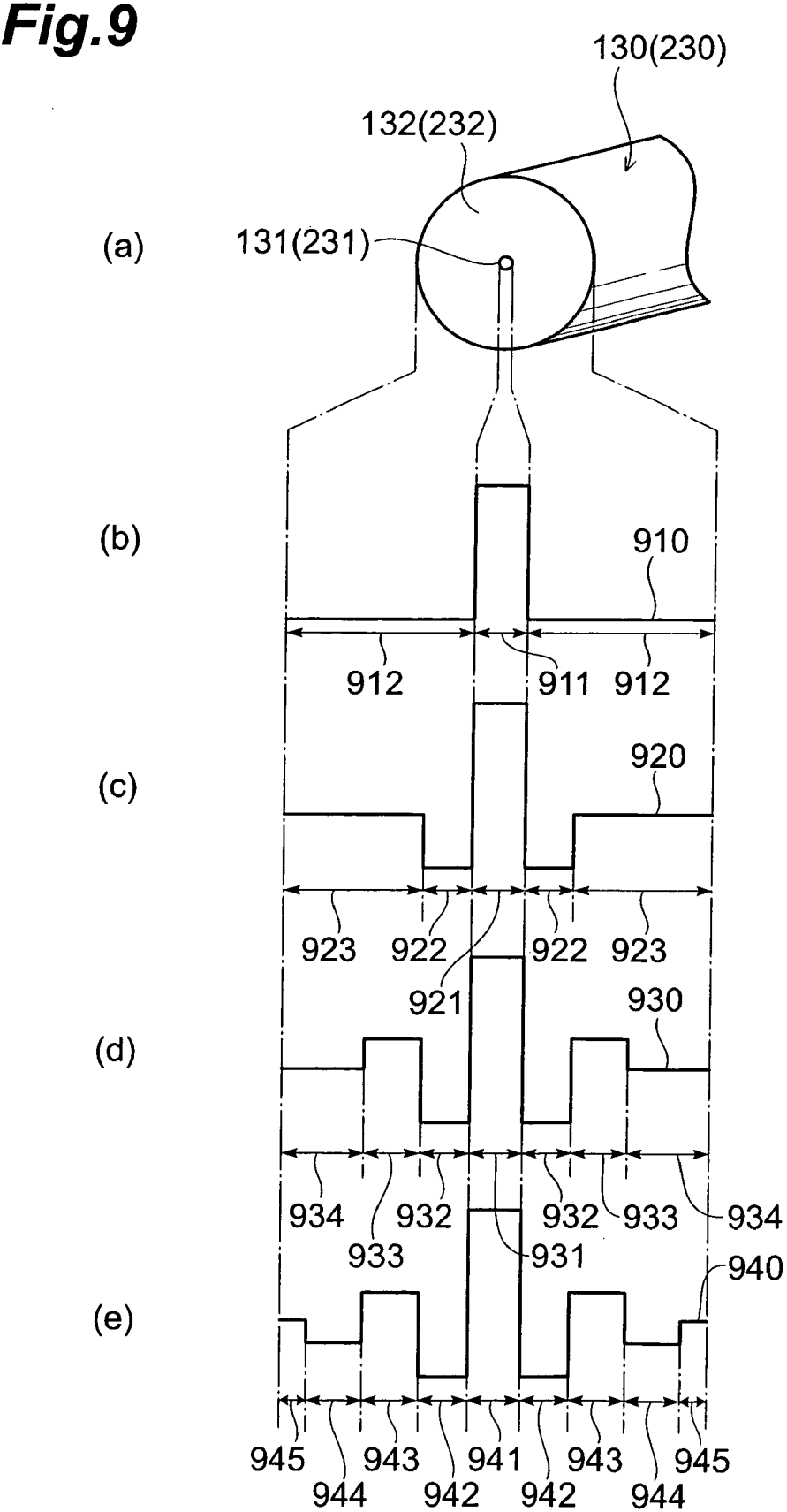
FIG. 9 is a sectional view and refractive index profile showing the structure of a highly nonlinear fiber employable in the light source apparatus according to the present invention.

FIG. 9 is a sectional view and refractive index profile showing the structure of a highly nonlinear fiber employable in the light source apparatus according to the present invention (a highly nonlinear fiber having an optical characteristic favorably combinable with the pulsed light source 110).

As shown in the area (a), the highly nonlinear fiber 130 acting as a broadband light producing fiber comprises a core region 131 extending along a predetermined axis, and a cladding region 132 provided on the outer periphery of the core region 131. The area (b) is the refractive index profile of the highly nonlinear fiber 130 having the cross-sectional structure shown in the area (a). In this refractive index profile, the regions 911 and 912 indicate respective refractive indexes of parts corresponding to the core region 131 and cladding region 132.

The cladding region 132 may be constituted by a plurality of regions having respective refractive indexes different from each other. In this case, the highly nonlinear fiber 130 may have any one of refractive index profiles 920 to 940 shown in the areas (c) to (e). The refractive index profile 920 is realized by the core region 131 and a cladding region 132 having a double cladding structure. Namely, the refractive index profile 920 is realized by the core region 131, a first cladding which is provided on the outer periphery of the core region 131 and has a refractive index lower than that of the core region 131, and a second cladding which is provided on the outer periphery of the first cladding and has a refractive index higher than that of the first cladding. Therefore, in the refractive index profile 920, the regions 921, 922, and 923 indicate respective refractive indexes corresponding to the core region 131, first cladding, and second cladding.

Similarly, the refractive index profile 930 is realized by the core region 131 and a cladding region 132 having a triple cladding structure. Namely, the refractive index profile 930 is realized by the core region 131, a first cladding which is provided on the outer periphery of the core region 131 and has a refractive index lower than that of the core region 131, a second cladding which is provided on the outer periphery of the first cladding and has a refractive index higher than that of the first cladding, and a third cladding which is provided on the outer periphery of the second cladding and has a refractive index lower than that of the second cladding. Therefore, in the refractive index profile 930, the regions 931, 932, 933, and 934 indicate respective refractive indexes corresponding to the core region 131, first cladding, second cladding, and third cladding.

The refractive index profile 940 is realized by the core region 131 and a cladding region 132 having a quadruple cladding structure. Namely, the refractive index profile 940 is realized by the core region 131, a first cladding which is provided on the outer periphery of the core region 131 and has a refractive index lower than that of the core region 131, a second cladding which is provided on the outer periphery of the first cladding and has a refractive index higher than that of the first cladding, a third cladding which is provided on the outer periphery of the second cladding and has a refractive index lower than that of the second cladding, and a fourth cladding which is provided on the outer periphery of the third cladding and has a refractive index higher than that of the third cladding. Therefore, in the refractive index profile 940, the regions 941, 942, 943, 944, and 945 indicate respective refractive indexes corresponding to the core region 131, first cladding, second cladding, third cladding, and fourth cladding.

FIG. 10 is a (first) table listing properties of the highly nonlinear fiber shown in FIG. 9.

In the parameters shown in FIG. 10, at least four tolerable levels are determined in transmission loss (dB/km), whereas three tolerable levels are determined in nonlinear refractive index n2 (m$^2$/W). Further, there are three tolerable levels in effective area $A_{eff}$ (μm$^2$), three tolerable levels in mode field diameter MFD (μm), three tolerable levels in nonlinearity constant γ (/W/km), four tolerable levels in polarization-mode dispersion PMD (ps·km$^{-1/2}$), two tolerable levels in bending loss (dB/m) at a diameter of 20 mm, one tolerable level in bending loss (dB/m) at a diameter of 40 mm, three tolerable levels in cutoff wavelength λc (μm) at a length of 2 m, two tolerable levels in cable cutoff wavelength λcc (μm), and four tolerable levels in fiber length. The tolerable levels of these parameters can be selected as appropriate, whereby fiber characteristics suitable for a broadband light producing fiber employable in the light source apparatus are determined by a combination of tolerable levels arbitrarily selected for the parameters.

In the case where the highly nonlinear fiber 130 is an optical fiber having a transmission loss of $10 \times 10^3$ dB/km (=10 dB/m), a nonlinear optical phenomenon is expected to appear sufficiently if the fiber length is about 1 m when pulsed light having a peak power of several kilowatts or higher is incident thereon. Though the fiber length must be increased when the power of input pulsed light is low, it is necessary for the transmission loss to be 10 dB/km or less when the fiber length exceeds 100 m. A length of 1 km or more is often required for fibers with a low linearity when pulsed light with a wide pulse duration is incident thereon. In this case, the transmission loss is preferably 1 dB/km or less. When the transmission loss is 0.5 dB/km or less, there is substantially no need to take account of the loss caused by the fibers, whereby their designing becomes easier. From the viewpoint of nonlinearity, the nonlinear refractive index n2 is $3.0 \times 10^{31\,20}$ m$^2$/W or more, preferably $4.0 \times 10^{-20}$ m$^2$/W or more, more preferably $5.0 \times 10^{-20}$ m$^2$/W or more; the effective area $A_{eff}$ is 30 μm$^2$ or less, preferably 20 μm$^2$ or less, more preferably 10 μm$^2$ or less; and the nonlinearity constant γ is 7/W/km or more, preferably 10/W/km or more, more preferably 20/W/km or more. Such conditions are required for producing broadband white light with an excellent flatness.

For winding the nonlinear fiber 130 about a coil with a small diameter, a sufficient resistance to bending at a diameter of 40 mm is obtained when the mode field diameter MFD is 6.2 μm or less, preferably 5 μm or less, and the fiber is sufficiently usable upon bending at a diameter of 20 mm when the mode field diameter MFD is 4 μm or less. For the same reason, the bending loss at a diameter of 20 mm is desired to be 10 dB/m or less. Satisfying this tolerable level not only makes the coil smaller, but also lowers the danger of increasing the loss because of local bending of the highly nonlinear fiber 130 itself. When the bending loss is 1 dB/m or less, there is substantially no need to take account of the increase in loss caused by bending, whereby designing becomes easier.

The cutoff wavelength λc at 2 m is preferably 1.7 μm or less. This can sufficiently secure a single-mode operation in the 1.55-μm wavelength band even when a fiber is wound about a small coil by several hundred meters or more. When the 2-m cutoff wavelength is 1.5 μm or less, it is not necessary to take account of the generation and propagation of high-order modes in the case of 1.55-μm pumping. In the case where the 2-m cutoff wavelength is 1.3 μm or less, a single-mode operation is secured for all the wavelength components of broadband light at 1300 nm or longer. In the case where the cable cutoff wavelength λcc is 1.5 μm or less, high-order mode oscillation is avoided when several hundred meters of a fiber are used. When the cable cutoff wavelength λcc is 1.5 μm or less, a single-mode operation is secured for not only input pulsed light but also output pulsed light. When the fiber length is 1000 m or less, longitudinal fluctuations in fiber characteristics become less influential, which reduces the burden on manufacture, whereby the fiber manufacturing cost can be cut down. When the fiber length is 10 m or less, there is substantially no need to take account of longitudinal fluctuations in fiber characteristics, which makes it easier to design the light source. When the fiber length is 1 m or less, other nonlinear optical phenomena such as Raman effect can be made less influential, which is advantageous in various points such as alleviation of difficulty in designing a light source selectively utilizing nonlinear optical phenomena, improvement in noise characteristics, and suppression of causes of fluctuations under the influence of external environments.

FIG. 11 is a spectrum of pulsed light emitted from the light source apparatus according to the first embodiment. The highly nonlinear fiber 130 prepared has a fiber length of 1 km and, as optical characteristics at a wavelength of 1550 nm, a nonlinearity constant γ of 20/W/km and a chromatic dispersion of 0.3 ps/nm/km. The pulsed light incident on the highly nonlinear fiber 130 has a pulse duration of 3 ps and a pulse energy of 100 pJ. In the wavelength spectrum of the broadband pulsed light (the output pulsed light emitted from the highly nonlinear fiber 130) obtained in this case, a region having a flatness of 4 dB or less exists over the wavelength band of 200 nm as shown in the area (a) of FIG. 11.

In this specification, the flatness of the wavelength spectrum refers to the width of fluctuation of pulsed light intensity fluctuating in a fixed wavelength band. In the case of the wavelength spectrum of broadband pulsed light shown in the area (b) of FIG. 11, the flatness of the wavelength spectrum refers to the width of fluctuation of the pulsed light intensity in wavelength bands W2a, W2b excluding a wavelength band W1 where residual components of input pulsed light overlap so that the pulse intensity changes remarkably. By contrast, the bandwidth of the wavelength band in which the fluctuation width (spectrum flatness) of the pulsed light intensity is suppressed to a predetermined value or less is given by (W2a+W2b) in the wavelength spectrum shown in the area (b) of FIG. 11.

FIG. 12 is a (second) table listing properties of the highly nonlinear fiber shown in FIG. 9. As shown in FIG. 12, four tolerable levels are determined in the transmission loss at a wavelength of 1380 nm in the highly nonlinear fiber favorably combinable with the pulsed light source 110. Specifically, one of $10 \times 10^3$ dB/km (=10 dB/m) or less, 20 dB/km or less, 5 dB/km or less, and 2 dB/km or less is satisfied. Four tolerable levels are determined in the transmission loss at a wavelength of 1300 nm. Specifically, one of $10 \times 10^3$ dB/km (=10 dB/m) or less, 20 dB/km or less, 5 dB/km or less, and 1.5 dB/km or less is satisfied. Four tolerable levels are determined in the transmission loss at a wavelength of 1650 nm. Specifically, one of $10 \times 10^3$ dB/km (=10 dB/m) or less, 20 dB/km or less, 5 dB/km or less, and 1.5 dB/km or less is satisfied. Three tolerable levels are determined in the nonlinear refractive index n2 at a wavelength of 1700 nm. Specifically, one of $2.5 \times 10^{-20}$ m$^2$/W or less, $3.0 \times 10^{20}$ m$^2$/W or less, and $4.0 \times 10^{-20}$ m$^2$/W or less is satisfied. Three tolerable levels are determined in the effective area $A_{eff}$ at a wavelength of 1700 nm. Specifically, one of 40 µm² or less, 30 µm² or less, and 20 µm² or less is satisfied. Three tolerable levels are determined in the mode field diameter MFD at a wavelength of 1700 nm. Specifically, one of 6.2 µm or less, 5 µm or less, and 4 µm or less is satisfied. Three tolerable levels are determined in the nonlinearity constant γ at a wavelength of 1700 nm. Specifically, one of 5/W/km or greater, 7/W/km or greater, and 14/W/km or greater is satisfied. Three tolerable levels are determined in the total second-order polarization-mode dispersion PMD. Specifically, one of 10 ps² or less, 1 ps² or less, and 0.1 ps² or less is satisfied. Two tolerable levels are determined in the bending loss upon bending at a diameter of 20 mm at a wavelength of 1700 nm. Specifically, one of 10 dB/m or less and 1 dB/m or less is satisfied. Only a tolerable level of 1 dB/m or less is determined in the bending loss upon bending at a diameter of 40 mm at a wavelength of 1700 nm.

FIG. 13 is a table listing properties of pulsed light emitted from the light source apparatus according to the present invention. In the output pulse characteristic of the pulsed light source acting as a seed light source, the frequency bandwidth from a peak to a drop of 10 dB or 20 dB is one of 5 THz or more, 10 THz or more, 50 THz or more, and 100 THz or more.

The flatness of the wavelength spectrum of the resulting broadband pulsed light is one of 6 dB or less, 3 dB or less, and 2 dB or less. The intensity of the broadband pulsed light is one of 1 mW or more, 10 mW or more, and 50 mW or more. The relative coherence coefficient $g_{12}$ may be any one of 0.5 or more, 0.8 or more, and 0.9 or more. The wavelength spectrum fluctuation width of the broadband pulsed light is any one of 300 nm or less, 100 nm or less, and 20 nm or less. The wavelength spectrum intensity fluctuation of the broadband pulsed light may be any one of 10 dB or less, 3 dB or less, and 1 dB or less. Values obtainable by the above-mentioned parameters can arbitrarily be combined.

The spectrum full width at half maximum fluctuation of the broadband pulsed light outputted from the highly nonlinear fiber 130 may be any one of 1 THz or less, 100 GHz or less, and 10 GHz or less. The side-mode suppression ratio may be any one of 20 dB or more, 30 dB or more, and 40 dB or more. The pedestal pulse suppression ratio of the broadband pulsed light may be any one of 10 dB or more, 20 dB or more, and 30 dB or more. The polarization crosstalk of the broadband pulsed light may be any one of 10 dB or more, 20 dB or more, and 25 dB or more.

Figure 14:
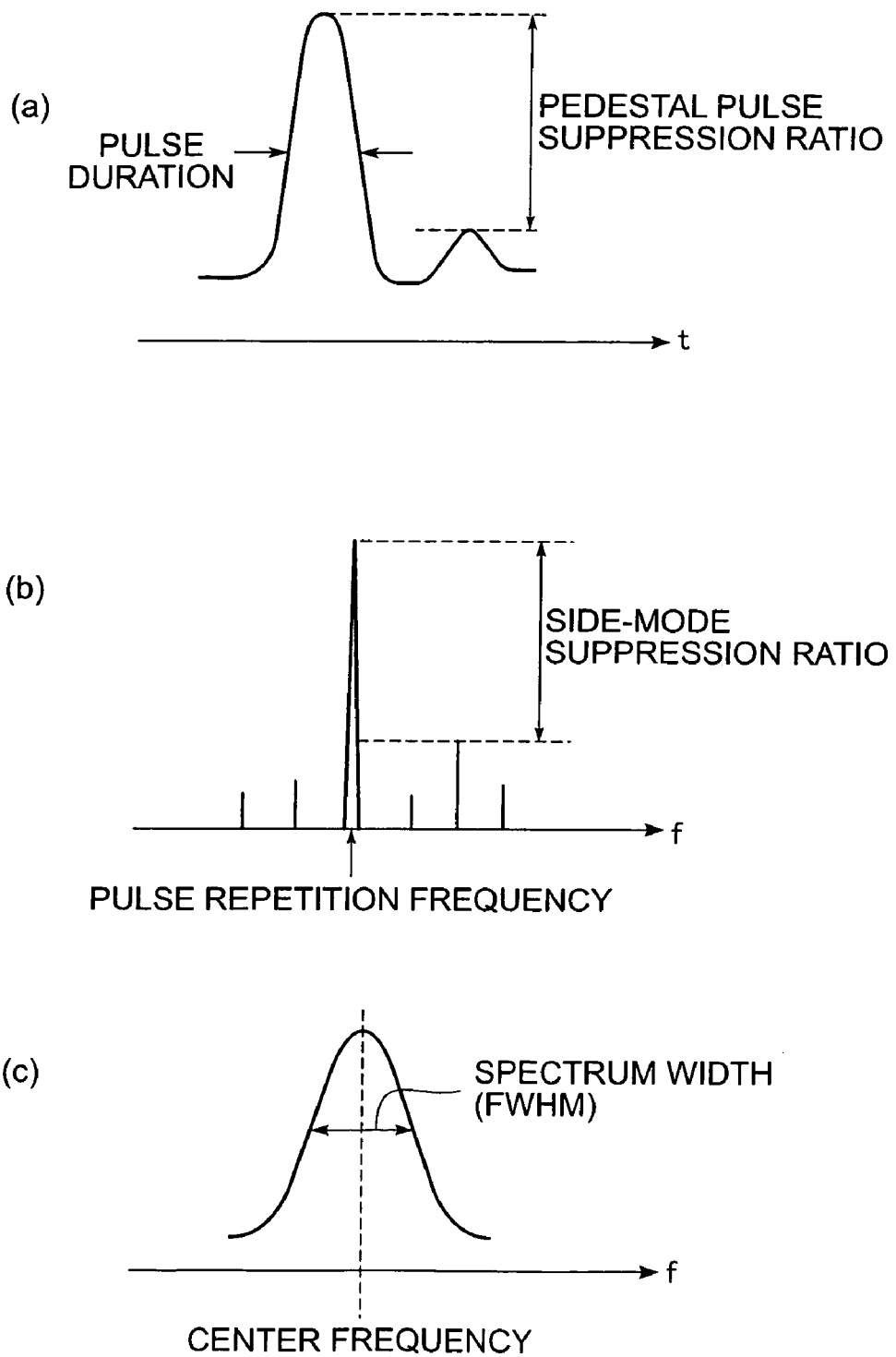
FIG. 14 is a view for explaining terms concerning pulsed light.

FIG. 14 is a view for explaining terms concerning pulsed light. In FIG. 14, the area (a) shows the pulse duration and pedestal pulse suppression ratio, the area (b) shows the side-mode suppression ratio, and the area (c) shows the spectrum width (half width at half maximum; FWHM).

Second Embodiment

Figure 15:
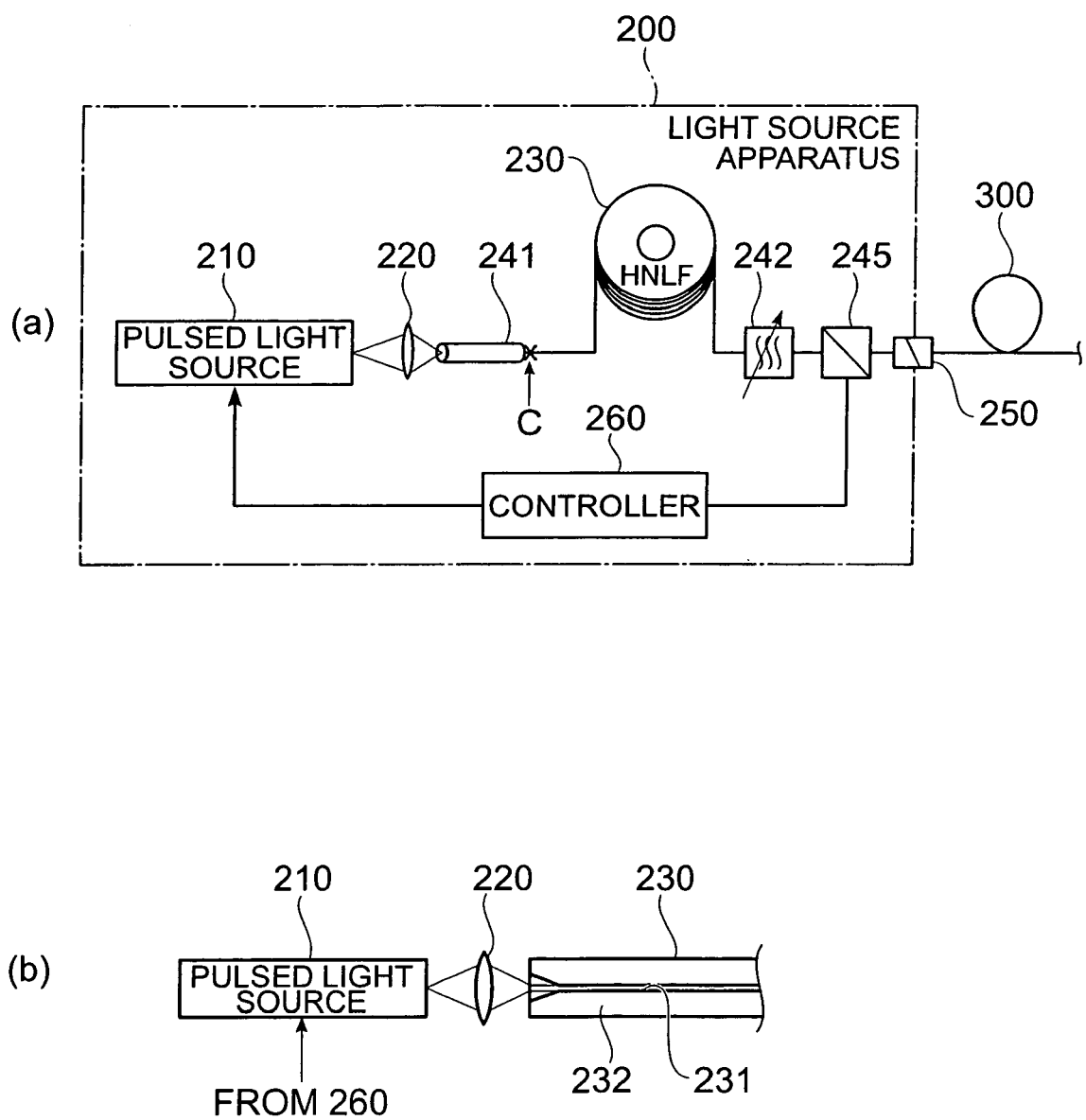
FIG. 15 is a view showing the structure of a second embodiment of the light source apparatus according to the present invention.

FIG. 15 is a view showing the structure of a second embodiment of the light source apparatus according to the present invention. The light source apparatus 200 according to the second embodiment includes a structure of feedback-controlling the power of broadband pulsed light emitted therefrom.

Namely, as shown in the area (a) of FIG. 15, the light source apparatus 200 comprises a pulsed light source 210, a lens 220, a coupling fiber 241, a highly nonlinear fiber (HNLF) 230 as a broadband light producing fiber, a band-pass filter 242, a demultiplexer 245, and a controller 260. At the output end of the light source apparatus 200, a connector 250 whose connecting part is obliquely cut is arranged in order to make it connectable with other optical components such as the optical fiber transmission line 300. The output pulse characteristic of the pulsed light source 210 is the same as that of the pulsed light source 110 in the first embodiment, whereas the optical characteristic required for the highly nonlinear fiber 230 is the same as that in the highly nonlinear fiber 130 in the first embodiment.

The pulsed light source 210 and the coupling fiber 241 are coupled to each other by way of the lens 229, while their coupling loss is 3 dB or less, preferably 1 dB or less. When the coupling loss is thus suppressed to 3 dB or less, the light source apparatus 200 can be kept from lowering its output. In other words, while the maximum laser output obtained when employing a low-cost pumping light source is about 100 mW, sufficient broadband pulsed light cannot be obtained unless the input power to the highly nonlinear fiber 230 is 50 mW or more. When the coupling loss is suppressed to 1 dB or less, broadband pulsed light having a wavelength band of several hundred nanometers can be obtained without the aid of optical amplifiers. For intentionally raising the input pulsed light power to the highly nonlinear optical fiber 230, an amplification fiber may be arranged as the coupling fiber 241 as in the first embodiment. An optical amplifier may be inserted between the coupling fiber 241 and highly nonlinear fiber 230 as a matter of course.

The coupling fiber 241 optically couples the laser output of the pulsed light source 210 to the highly nonlinear fiber 230. When the coupling fiber 241 is thus prepared separately, lower coupling loss is expected. On the other hand, the coupling fiber 241 is preferably fused to the nonlinear fiber 230 at a junction C. This is because the seed light (pulsed light) can be guided to the nonlinear fiber 230 with a low loss thereby.

The controller 260 monitors the output power of a part of the broadband pulsed light separated by the demultiplexer 245. According to the result of monitoring, the controller 260 regulates the output pulse characteristic of the pulsed light source 210. Thus feeding back the monitored information of the emitted broadband pulsed light to the pulsed light source 210 acting as the seed light source can stabilize the output pulse characteristic of the pulsed light source 210. Namely, a stable light source apparatus having a noise characteristic lower than the noise and jitter of the seed light (pulsed light) emitted from the pulsed light source 210 can be realized. Further, the demultiplexer 245 may filter out a light component in a wavelength band not utilized under an actual use condition, whereas the power of this light component can be monitored by the controller 260. As a consequence, the light component in the wavelength band in use can be utilized with the highest power possible, whereby the efficiency in broadband light utilization improves.

As another structural example, the highly nonlinear fiber 230 may be optically coupled to the pulsed light source 210 by way of the lens 220 while excluding the coupling fiber as shown in the area (b) of FIG. 15. In this case, it is unnecessary to take account of the change in pulse characteristics occurring when the coupling fiber 241 is arranged, since the highly nonlinear fiber 230 and the pulsed light source 210 are coupled together by way of the lens 220.

When the highly nonlinear fiber 230 and the pulsed light source 210 are coupled together by way of the lens 220, it will be preferred if at least one end part of the highly nonlinear fiber 230 has an expanded core diameter. This is because the coupling loss can be reduced thereby. When the pulsed light source 210 has a fiber output end as in the above-mentioned Patent Document 2, it will be preferred if the output end of the pulsed light source 210 and the light entrance end of the highly nonlinear fiber 230 are fusion-spliced in order to reduce the splice loss, produce broadband light with a high efficiency, and prevent abnormalities from occurring in the spliced part.

Figure 16:
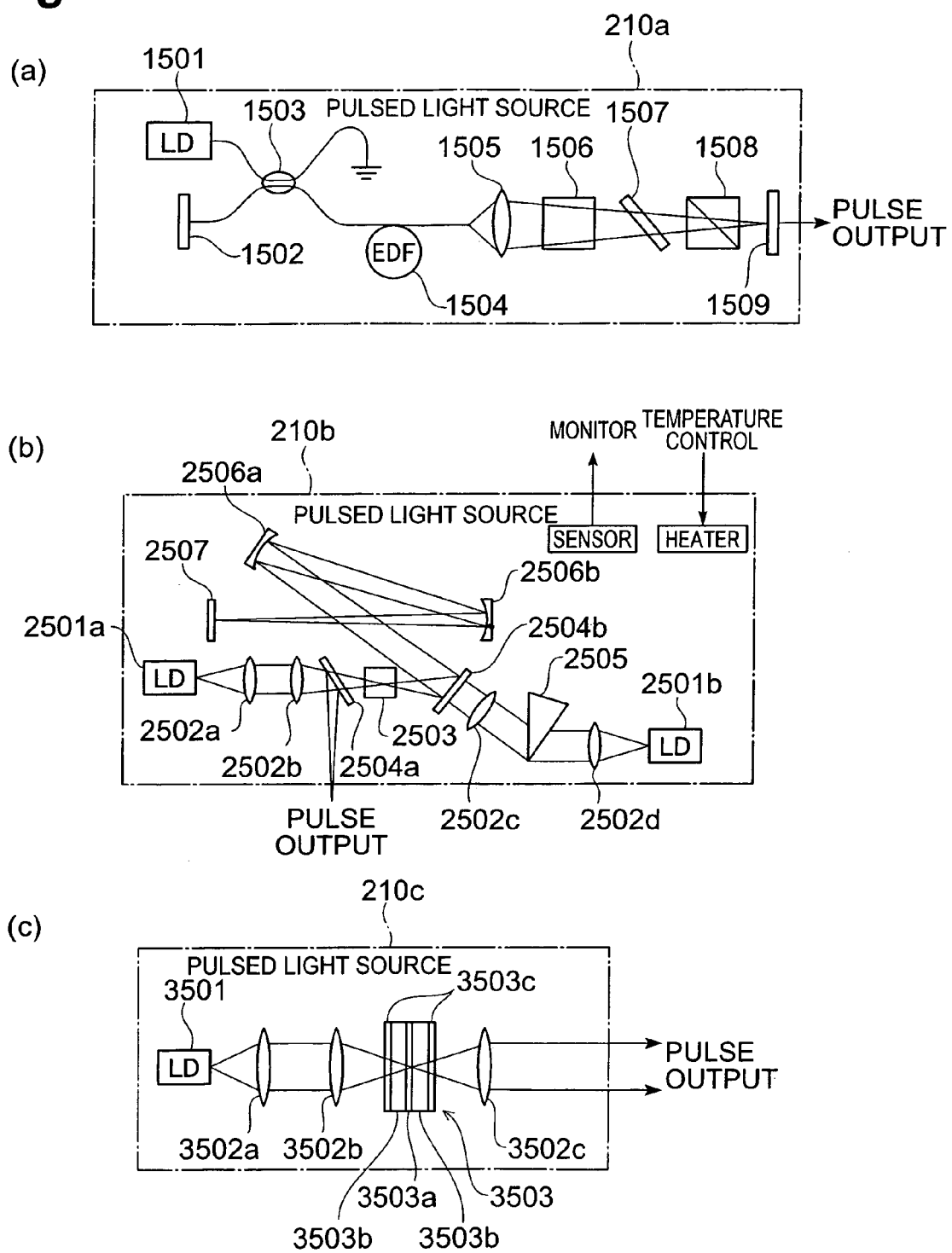
FIG. 16 is a view showing structures of various pulsed light sources employable in the light source apparatus according to the second embodiment.

FIG. 16 is a view showing structures of various pulsed light sources employable in the light source apparatus according to the second embodiment.

The area (a) of FIG. 16 illustrates the structure of a pulsed light source 210a constructed by the modelocked fiber laser described in the above-mentioned Nonpatent Document 1. The pulsed light source 210a comprises an LD 1501 as a pumping light source, a Faraday rotator mirror 1502, a coupler 1503, an erbium-doped fiber (EDF) 1504 as an amplification fiber, a lens 1505, a Faraday rotator 1506, a wavelength plate 1507, a deflector 1508, and a half mirror 1509 constituting a resonator with the Faraday rotator 1502.

Such a pulsed light source 210a can be realized by a simple structure, and thus can be made smaller and can be coupled to a fiber system with a low loss. Since the optical fiber EDF 1504 is an amplification medium, the optical path length contributing to light amplification can be elongated in the pulsed light source 210a. Though the EDF is employed as the amplification fiber 1504 in the pulsed light source 210a shown in the area (a) of FIG. 16, a Yb-doped fiber may be employed as well. Even when the EDF is employed, mirrors may be arranged at both ends of the EDF acting as an amplification medium, whereby an EDF ring laser can be realized. Preferably, the EDF ring laser comprises a controller for regulating the laser cavity length. The laser cavity length can be controlled by use of a piezoelectric device, prism, or movable mirror.

The pulsed light source 210b shown in the area (b) of FIG. 16 is a light source having a laser cavity within which a saturable absorber having a high-speed response characteristic of a nanosecond or shorter is arranged. In this case, a light source which can stably be oscillated in a modelocked fashion can easily be realized at low cost. The pulsed light source 210b has a response characteristic of a nanosecond or shorter, and thus can produce light having a short pulse of a nanosecond or less.

Specifically, the pulsed light source 210b has a structure similar to the light source described in the above-mentioned Patent Document 3 using a semiconductor saturable absorber mirror (SESAM). In this case, a structure which can stably be oscillated in a modelocked fashion can easily be realized at low cost. The pulsed light source 210b has LDs 2501a, 2501b as two pumping light sources. The pumping light emitted from the LD 2501a illuminates a pumping medium 2503 by way of lenses 2502a, 2502b and a dichroic mirror 2504a. On the other hand, the pumping light emitted from the LD 2501b passes a lens 2502d, a prism 2505, and a lens 2502c, so as to reach a dichroic mirror 2504b, and is split by the dichroic mirror 2504b into light illuminating the pumping medium 2503 and light reaching a semiconductor saturable absorber mirror 2507 by way of concave mirrors 2506a, 2506b. The end face of the pumping medium 2503 on the LD 2501a side and the reflecting surface of the semiconductor saturable absorber mirror 2507 constitute a laser cavity, whereby the light separated by the dichroic mirror 2504a is finally emitted as the seed light.

Preferred as the saturable absorber arranged within the laser cavity is a semiconductor saturable absorber which can easily be mass-produced and is expected to lower the cost. Also employable are carbon nanotubes with a low material cost which can cut down the manufacturing cost.

For preventing external noises such as electromagnetic waves from entering, it will be preferred if the inside of the laser cavity is electrically shielded. The laser cavity itself may be provided with a hermetic shield or a protecting structure similar thereto. This aims at avoiding the deterioration in long-term reliability and damages to laser oscillation characteristics caused by water entering from the outside and the like. When a structure compensating for the vibration in the laser cavity is provided, the pulsed light source 210b can stably operate for a long period. Preferably, the controller regulates a part or the whole of such a laser cavity in terms of temperature and moisture (see the area (b) of FIG. 16). This is because the pulsed light source 210b can stably operate thereby.

In the light source apparatus 200 according to the second embodiment, the connector arranged at the output end has its connecting part obliquely cut. This aims at preventing the light source apparatus 200 from being damaged by abnormalities such as the temperature rise in the connecting part and the dust burned onto the end face.

An electrooptic modulator is employed in the pulsed light source 210c shown in the area (c) of FIG. 16 in order to make it possible for external electric signals to regulate the pulsed light source 210c itself. Namely, the pulsed light source 210c comprises an LD 3501; lenses 3502a, 3502b, 3502c constituting an optical system; and an electrooptic modulator 3503 arranged between the lenses 3502b, 3502c. Electrooptic crystals such as lithium niobate and the like are excellent as the electrooptic modulator 3503 because of their large electrooptic effect and favorable efficiency. When such an electrooptic crystal is employed, the electrooptic modulator can be constructed by holding an electrooptic crystal layer 3503a between substrates 3503b provided with respective reflecting films 3503c. A semiconductor optical amplifier may also be employed as the electrooptic modulator in order to make it smaller and integrated.

Figure 17:
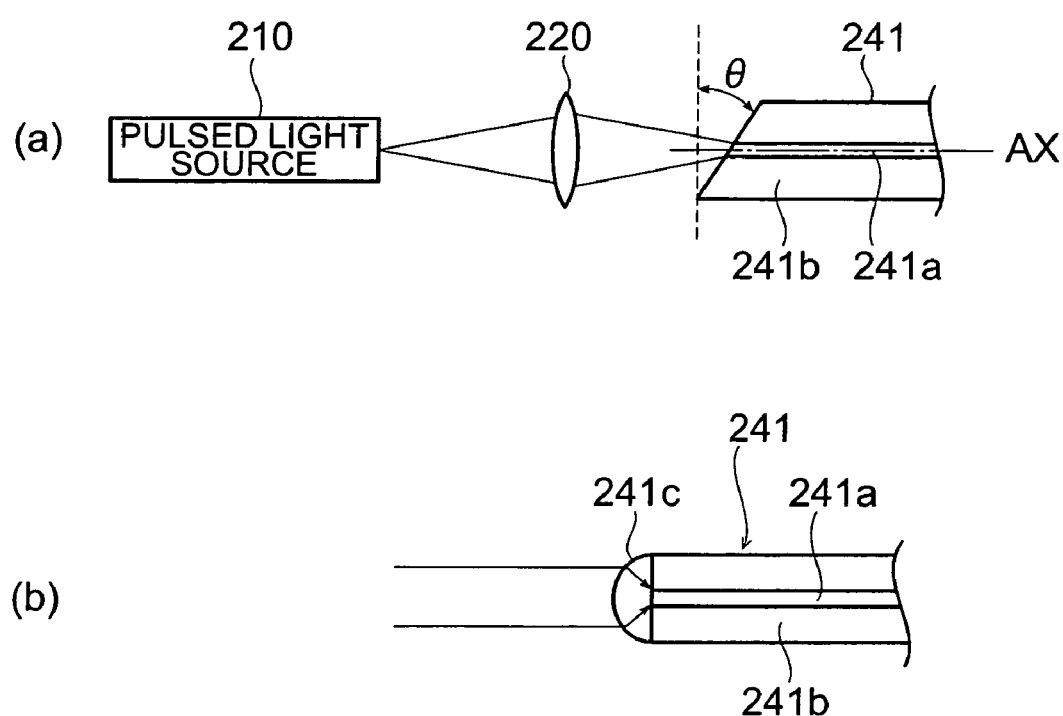
FIG. 17 is a view for explaining an optical coupling state in the light source apparatus according to the second embodiment.

FIG. 17 is a view for explaining an optical coupling state in the light source apparatus according to the second embodiment.

In FIG. 17, the area (a) shows a state where the coupling fiber 241 whose end face is obliquely cut by an angle θ with respect to a plane orthogonal to an optical axis AX is optically coupled to the pulsed light source 210 by way of the lens 220. The coupling fiber 241 comprises a core region 241a and a cladding region 241b provided on the outer periphery of the core region 241a. The light reflected by the light entrance end of a coupling fiber has conventionally returned into the laser cavity, thereby making the laser oscillation unstable. Therefore, the light entrance end face of the coupling fiber 241 is obliquely cut in the coupling state shown in the area (a), so as to change the angle of reflection. The return light may become problematic in the case of light having a short pulse of several picoseconds or less, whereby the oblique cutting achieves a greater effect in particular. It will be sufficient if the angle of oblique cutting is 5° or more. This is because the laser oscillation becomes remarkably unstable at such an angle. The angle of the oblique cutting is preferably Brewster's angle. This is because the laser oscillation can maximally be prevented thereby from becoming unstable.

On the other hand, the light entrance end face of the coupling fiber 241 may be a lens 241c as shown in the area (b) of FIG. 17. Effects such as relaxation of characteristics required for lenses of external coupling type, reduction of the number of lenses, and alleviation of operations for constructing coupling systems and the like can be expected.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A light source apparatus comprising:
   a pulsed light source having an output pulse characteristic in which a bandwidth of a frequency band extending until the output pulse drops by 10 dB from a peak is 5 THz or more; and
   a broadband light producing fiber for inputting pulsed light from said pulsed light source and producing broadband pulsed light by utilizing a nonlinear optical phenomenon, the broadband light having a region whose power fluctuation is suppressed to 6 dB or less extends over 100 nm or more.

2. A light source apparatus according to claim 1, further comprising a controller for regulating the output pulse characteristic of said pulsed light source.

3. A light source apparatus according to claim 2, further comprising a demultiplexer for separating a part of the broadband pulsed light emitted from said broadband light producing fiber,
   wherein said controller monitors the power of the broadband pulsed light emitted from said broadband light producing fiber and regulates the output pulse characteristic of said pulsed light source in accordance with a result of monitoring.

4. A light source apparatus according to claim 1, further comprising a coupling fiber arranged between said pulsed light source and said broadband light producing fiber, said coupling fiber having a light entrance end optically coupled to a pulse exit end of said pulsed light source by way of a lens and a light exit end fusion-spliced to a light entrance end of said broadband light producing fiber.

5. A light source apparatus according to claim 4, wherein said coupling fiber includes an amplification fiber.

6. A light source apparatus according to claim 1, wherein said broadband light producing fiber is arranged such that a light entrance end thereof is optically coupled to a pulse exit end of said pulsed light source by way of a lens, a leading end part of said broadband light producing fiber including the light entrance end thereof having an expanded core diameter.

7. A light source apparatus according to claim 1, wherein said broadband light producing fiber comprises a core region extending along a predetermined axis and a cladding region provided on an outer periphery of said core region, said cladding region being constituted by one or more regions having respective refractive indexes different from each other.

8. A light source apparatus according to claim 7, wherein said broadband light producing fiber has, as characteristics at a wavelength of 1550 nm, a nonlinear refractive index n2 of $3 \times 10^{31\ 20}$ m$^2$/W or more, an effective area $A_{eff}$ of 30 μm$^2$ or less, a nonlinearity constant γ of 7/W/km or more, a transmission loss of 10 dB/m or less, a polarization-mode dispersion PMD of 10 ps·km$^{-1/2}$ or less, a mode field diameter MFD of 6.2 μm or less, a bending loss of 10 dB/m or less when bent at a diameter of 20 mm, and a bending loss of 1 dB/m or less when bent at a diameter of 40 mm, and wherein said broadband light producing fiber has a fiber length of 1 km or less, a cutoff wavelength λc of 1.7 μm or less at a fiber length of 2 m, and a cable cutoff wavelength λcc of 1.5 μm or less.

9. A light source apparatus according to claim 1, wherein said pulsed light source includes a fiber laser.

10. A light source apparatus according to claim 1, wherein said pulsed light source includes a saturable absorber arranged within a laser cavity.

11. A light source apparatus according to claim 1, wherein said pulsed light source includes an electrooptic modulator.

12. A light source apparatus comprising:
    a pulsed light source having an output pulse characteristic in which a bandwidth of a frequency band extending until the output pulse drops by 20 dB from a peak is 5 THz or more; and
    a broadband light producing fiber for inputting pulsed light from said pulsed light source and producing broadband pulsed light by utilizing a nonlinear optical phenomenon, the broadband light having a region whose power fluctuation is suppressed to 6 dB or less extends over 100 nm or more.

13. A light source apparatus according to claim 12, further comprising a controller for regulating the output pulse characteristic of said pulsed light source.

14. A light source apparatus according to claim 12, further comprising a demultiplexer for separating a part of the broadband pulsed light emitted from said broadband light producing fiber,
    wherein said controller monitors the power of the broadband pulsed light emitted from said broadband light producing fiber and regulates the output pulse characteristic of said pulsed light source in accordance with a result of monitoring.

15. A light source apparatus according to claim 13, further comprising a coupling fiber arranged between said pulsed light source and said broadband light producing fiber, said coupling fiber having a light entrance end optically coupled to a pulse exit end of said pulsed light source by way of a lens and a light exit end fusion-spliced to a light entrance end of said broadband light producing fiber.

16. A light source apparatus according to claim 15, wherein said coupling fiber includes an amplification fiber.

17. A light source apparatus according to claim 12, wherein said broadband light producing fiber is arranged such that a light entrance end thereof is optically coupled to a pulse exit end of said pulsed light source by way of a lens, a leading end part of said broadband light producing fiber including the light entrance end thereof having an expanded core diameter.

18. A light source apparatus according to claim 12, wherein said broadband light producing fiber comprises a core region extending along a predetermined axis and a cladding region provided on an outer periphery of said core region, said cladding region being constituted by one or more regions having respective refractive indexes different from each other.

19. A light source apparatus according to claim 18, wherein said broadband light producing fiber has, as characteristics at a wavelength of 1550 nm, a nonlinear refractive index n2 of $3 \times 10^{-20}$ m$^2$/W or more, an effective area $A_{eff}$ of 30 μm$^2$ or less, a nonlinearity constant γ of 7/W/km or more, a transmission loss of 10 dB/m or less, a polarization-mode dispersion PMD of 10 ps·km$^{-1/2}$ or less, a mode field diameter MFD of 6.2 μm or less, a bending loss of 10 dB/m or less when bent at a diameter of 20 mm, and a bending loss of 1 dB/m or less when bent at a diameter of 40 mm, and wherein said broadband light producing fiber has a fiber length of 1 km or less, a cutoff wavelength $\lambda c$ of 1.7 µm or less at a fiber length of 2 m, and a cable cutoff wavelength $\lambda cc$ of 1.5 µm or less.

20. A light source apparatus according to claim 12, wherein said pulsed light source includes a fiber laser.

21. A light source apparatus according to claim 12, wherein said pulsed light source includes a saturable absorber arranged within a laser cavity.

22. A light source apparatus according to claim 12, wherein said pulsed light source includes an electrooptic modulator.

* * * * *